(12) United States Patent
Fujii et al.

(10) Patent No.: US 11,021,085 B2
(45) Date of Patent: Jun. 1, 2021

(54) SEAT AIR CONDITIONER

(71) Applicant: DENSO CORPORATION, Kariya (JP)

(72) Inventors: Takahisa Fujii, Kariya (JP); Hironobu Murakami, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 0 days.

(21) Appl. No.: 16/708,550

(22) Filed: Dec. 10, 2019

(65) Prior Publication Data

US 2020/0108753 A1 Apr. 9, 2020

Related U.S. Application Data

(63) Continuation of application No. PCT/JP2018/019166, filed on May 17, 2018.

(30) Foreign Application Priority Data

Jun. 20, 2017 (JP) .............................. JP2017-120674

(51) Int. Cl.
*B60N 2/56* (2006.01)
*B60N 2/20* (2006.01)
*B60H 1/00* (2006.01)

(52) U.S. Cl.
CPC .............. *B60N 2/5657* (2013.01); *B60N 2/20* (2013.01); *B60H 1/00285* (2013.01); *B60H 1/00842* (2013.01); *B60N 2/5642* (2013.01)

(58) Field of Classification Search
CPC ................ B60N 2/5642; B60N 2/5657; B60H 1/00285; B60H 1/00842
See application file for complete search history.

(56) References Cited

U.S. PATENT DOCUMENTS

| | | | | |
|---|---|---|---|---|
| 2,978,972 A | * | 4/1961 | Hake | B60N 2/5628 454/120 |
| 5,450,894 A | * | 9/1995 | Inoue | B60H 1/00664 165/43 |
| 5,626,021 A | * | 5/1997 | Karunasiri | A47C 7/74 236/49.3 |
| 6,491,578 B2 | * | 12/2002 | Yoshinori | B60H 1/00007 165/203 |

(Continued)

FOREIGN PATENT DOCUMENTS

JP 201583406 A 4/2015
JP 2016011071 A 1/2016

*Primary Examiner* — Syed A Islam
(74) *Attorney, Agent, or Firm* — Harness, Dickey & Pierce, P.L.C.

(57) ABSTRACT

A seat air conditioner is applied to a seat including a seat cushion portion, a seat back portion, and a reclining mechanism portion for varying a reclining angle of the seat back portion relative to the seat cushion portion. The seat air conditioner includes a blower, an air blowing portion from which the air blown by the blower is blown toward the seated occupant, and a wind direction adjustment unit that adjusts a wind direction of the blown air. The wind direction adjustment unit is configured to adjust the wind direction of the air blown out from at least the part of the air blowing portion such that the air from the air blowing portion is blown toward a specific part of the seated occupant regardless of the reclining angle when the seat back portion is inclined toward a rear side of the seat.

7 Claims, 15 Drawing Sheets

(56) References Cited

U.S. PATENT DOCUMENTS

| | | | | |
|---|---|---|---|---|
| 7,467,823 | B2* | 12/2008 | Hartwich | B60H 1/00285 |
| | | | | 297/180.14 |
| 8,176,741 | B2* | 5/2012 | Kameyama | B60H 1/00478 |
| | | | | 62/3.3 |
| 9,004,993 | B2* | 4/2015 | Fujii | B60H 1/00285 |
| | | | | 454/120 |
| 10,214,125 | B2* | 2/2019 | Sakane | B60N 2/879 |
| 10,232,748 | B2* | 3/2019 | Akaike | B60N 2/5657 |
| 10,434,908 | B2* | 10/2019 | Akaike | B60N 2/75 |
| 10,471,865 | B2* | 11/2019 | Kato | B60N 2/5657 |
| 10,479,242 | B2* | 11/2019 | Kato | B60N 2/5635 |
| 10,743,671 | B2* | 8/2020 | Akaike | B60N 2/70 |
| 2002/0041116 | A1* | 4/2002 | Bogisch | B60N 2/5635 |
| | | | | 297/180.1 |
| 2006/0172679 | A1* | 8/2006 | Gehring | B60H 1/3421 |
| | | | | 454/152 |
| 2009/0117841 | A1* | 5/2009 | Goto | B60H 1/00064 |
| | | | | 454/127 |
| 2011/0187165 | A1* | 8/2011 | Oota | B60N 2/5657 |
| | | | | 297/180.14 |
| 2013/0299128 | A1* | 11/2013 | Bergamini | B60H 1/00207 |
| | | | | 165/59 |
| 2016/0250905 | A1* | 9/2016 | Tanaka | B60H 1/00285 |
| | | | | 454/75 |
| 2016/0272038 | A1* | 9/2016 | Tanaka | B60N 2/5657 |
| 2016/0347219 | A1* | 12/2016 | Akaike | B60N 2/5628 |
| 2019/0291614 | A1* | 9/2019 | Kawano | B60N 2/5635 |
| 2020/0039398 | A1* | 2/2020 | Rappl | B60N 2/5642 |
| 2020/0198507 | A1* | 6/2020 | Asahara | B60N 2/5607 |
| 2020/0238873 | A1* | 7/2020 | Akaike | B60N 2/5657 |

* cited by examiner

SEAT AIR CONDITIONER

CROSS-REFERENCE TO RELATED APPLICATIONS

The present application is a continuation application of International Patent Application No. PCT/JP2018/019166 filed on May 17, 2018, which designated the U.S. and claims the benefit of priority from Japanese Patent Application No. 2017-120674 filed on Jun. 20, 2017. The entire disclosures of all of the above applications are incorporated herein by reference.

TECHNICAL FIELD

The present disclosure relates to a seat air conditioner for use in a seat in which a reclining angle can be varied.

BACKGROUND

A vehicle seat air conditioner may include air blowing ports for blowing air to a seated occupant. In an exemplary configuration, such air blowing ports may be provided on both sides of the seat along a width direction.

SUMMARY

According to one aspect of the present disclosure, a seat air conditioner is applied to a seat including a seat cushion portion for supporting a lower body of a seated occupant, a seat back portion for supporting an upper body of the seated occupant, and a reclining mechanism portion for varying a reclining angle of the seat back portion relative to the seat cushion portion. The seat air conditioner includes a blower that blows air, an air blowing portion from which the air blown by the blower is blown toward the seated occupant, and a wind direction adjustment unit that adjusts a wind direction of the air blown out from at least a part of the air blowing portion. The wind direction adjustment unit is configured to adjust the wind direction of the air blown out from at least the part of the air blowing portion such that the air from at least the part of the air blowing portion is blown toward a specific part of the seated occupant regardless of the reclining angle when the seat back portion is inclined toward a rear side of the seat.

DETAILED DESCRIPTION

Figure 1:
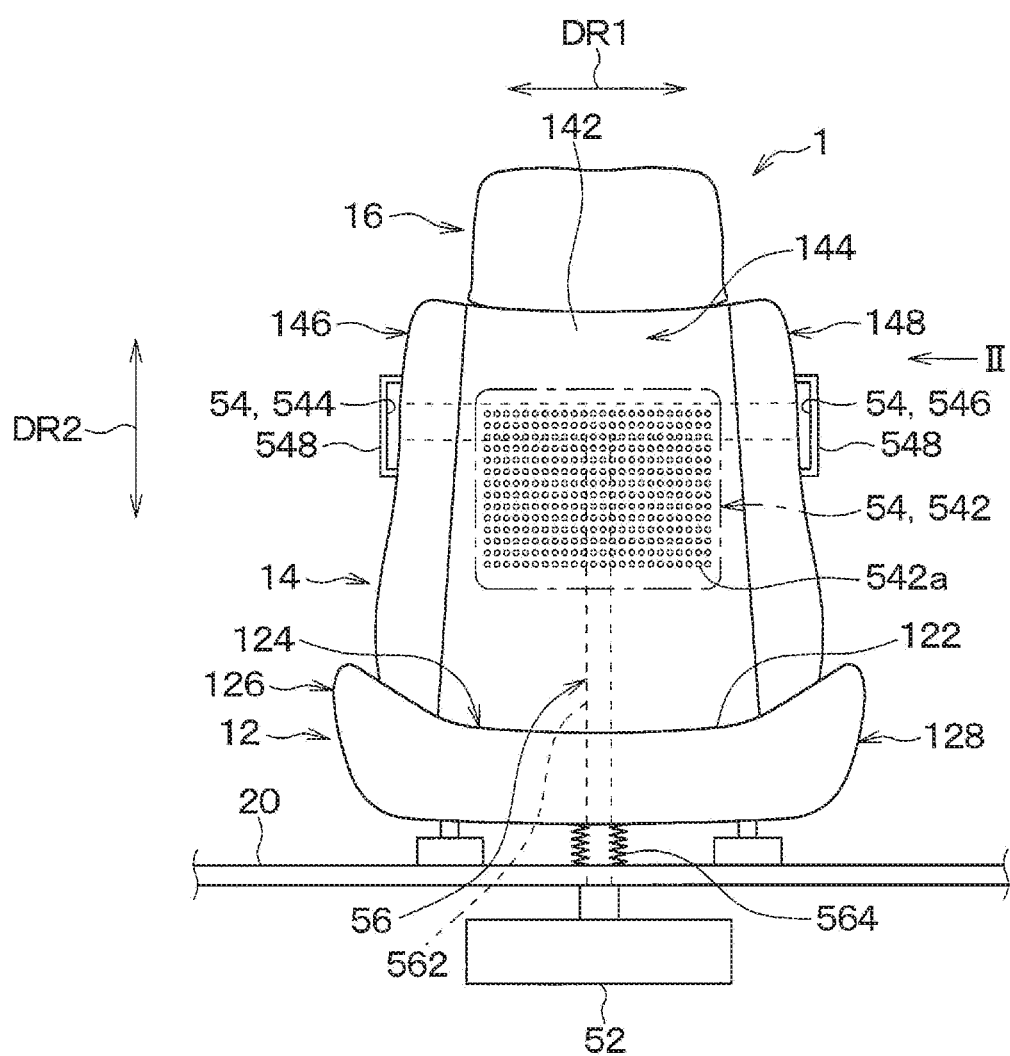
FIG. 1 is a schematic configuration diagram of a vehicle seat including a seat air conditioner according to a first embodiment.

Embodiments of the present disclosure will be described below with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. In the following embodiments, the embodiments can be partially combined with each other as long as the embodiments do not cause any trouble in combination, even if the combination is not specified in particular.

First Embodiment

The present embodiment will be described with reference to FIGS. 1 to 13. In the present embodiment, an example in which a seat air conditioner 50 is applied to a vehicle seat 1 according to the present disclosure will be described. An arrow DR1 shown in FIG. 1 indicates a width direction of a vehicle seat 1 (that is, a seat width direction). An arrow DR2 shown in FIGS. 1 and 2 indicates a vertical direction of the vehicle seat 1 (that is, a vertical direction of the seat). Further, an arrow DR3 shown in FIG. 2 indicates an anteroposterior direction of the vehicle seat 1 (that is, a seat anteroposterior direction). In the vehicle seat 1 according to the present embodiment, a seat width direction, a seat vertical direction, and a seat anteroposterior direction correspond to a width direction of the vehicle, a vertical direction of the vehicle, and an anteroposterior direction of the vehicle, respectively.

Figure 2:
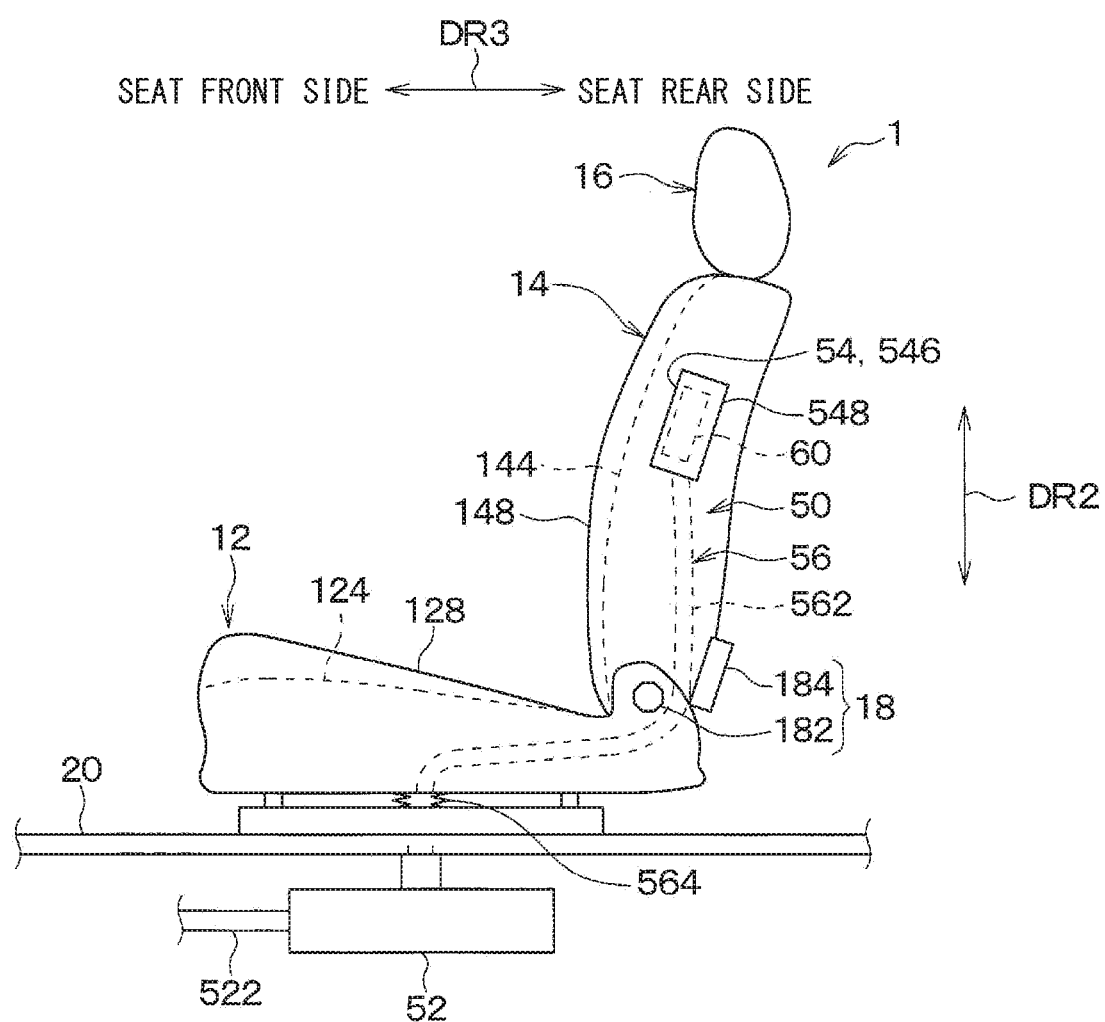
FIG. 2 is a view taken along a direction indicated by an arrow II in FIG. 1.

The vehicle seat 1 shown in FIGS. 1 and 2 includes a seat cushion portion 12 for supporting a lower body side of an occupant (that is, seated occupant) seated on the vehicle seat 1, a seat back portion 14 for supporting an upper body side of the seated occupant, and a headrest 16 for supporting a head of the seated occupant.

Further, the vehicle seat 1 is provided with a reclining mechanism portion 18 that changes a reclining angle θr, which is an inclination angle of the seat back portion 14 with respect to the seat cushion portion 12. The vehicle seat 1 according to the present embodiment is a seat (so-called power seat) capable of electrically adjusting the reclining angle θr.

The reclining mechanism portion 18 includes a gear mechanism 182 for changing the reclining angle θr, and an electric motor 184 for driving the gear mechanism 182. The reclining mechanism portion 18 can adjust the reclining angle θr by driving the electric motor 184.

Figure 3:
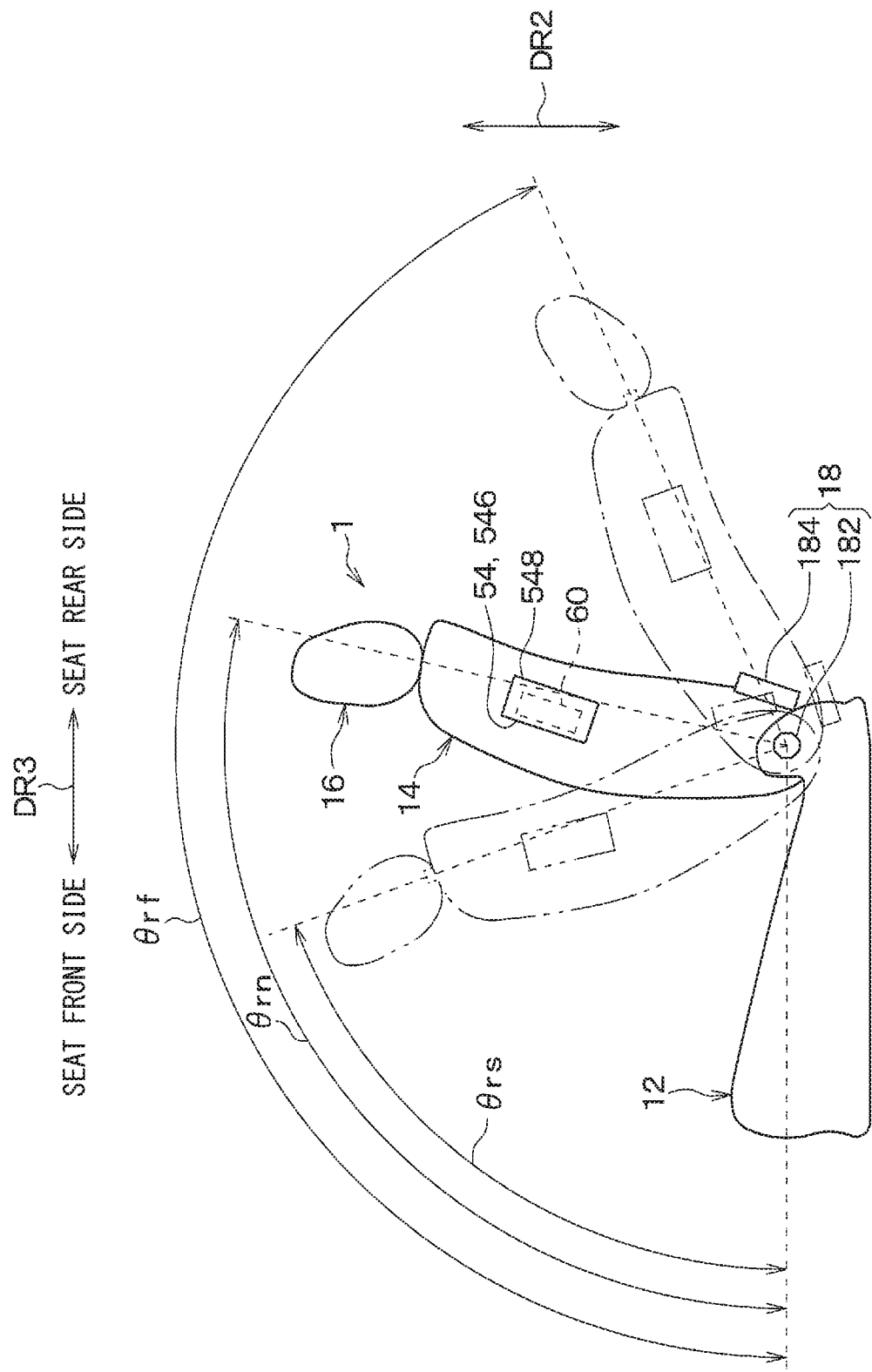
FIG. 3 is an illustrative view illustrating a reclining function of the vehicle seat.

When the seat back portion 14 is inclined toward a rear side of the seat, the reclining mechanism portion 18 can increase the reclining angle θr from a basic posture indicated by a solid line in FIG. 3 to a full flat posture indicated by a one-dot chain line in FIG. 3.

The basic posture is a posture in which the seat back portion 14 stands on the seat cushion portion 12 (for example, θrn=95°). The full flat posture is a posture in which the seat back portion 14 is largely inclined toward the rear side of the seat (for example, θrf=150°) so that the seated occupant can lie.

The reclining mechanism portion 18 can reduce the reclining angle from the basic posture indicated by the solid line in FIG. 3 to an accommodation posture indicated by a two-dot chain line in FIG. 3. The accommodation posture is a posture in which the seat back portion 14 is folded on the seat cushion portion 12 (for example, θrs=60°).

Returning to FIGS. 1 and 2, the seat cushion portion 12 includes a cushion frame (not shown) forming a skeleton, a seat pad (not shown) disposed on the seated occupant side of the cushion frame, and a seat cover 122 covering the surface of the seat pad.

The seat cushion portion 12 has a seat support portion 124 in which a substantially central portion of the seat cushion portion 12 in the seat width direction DR1 forms a central support portion for supporting the seated occupant. The seat cushion portion 12 is provided with side support portions 126 and 128 at portions located on both outer sides of the seat cushion portion 12 in the seat width direction DR1 from the seat support portion 124.

The seat back portion 14 includes a back frame (not shown) forming a skeleton, a back pad (not shown) disposed on the seated occupant side of the back frame, and a back cover 142 covering the surface of the back pad.

The seat back portion 14 is a back support portion 144 in which a substantially central portion of the seat width direction DR1 forms a central support portion for supporting a seated occupant. The seat back portion 14 is provided with side support portions 146 and 148 at portions located on both outer sides of the back support portion 144 in the seat width direction DR1.

The vehicle seat 1 configured as described above has a seat air conditioner 50 disposed inside for blowing the air toward the upper body side of the seated occupant. The seat air conditioner 50 according to the present embodiment is configured to blow out the air, which is adjusted to a desired temperature by a vehicle interior air conditioning unit (not shown), from the vehicle seat 1.

The seat air conditioner 50 includes a blower 52 for blowing the air, an air blowing portion 54 for blowing the air blown by the blower 52 toward the seated occupant, a seat duct 56 for guiding the air blown out from the blower 52 to the air blowing portion 54, and a control device 100.

The blower 52 is disposed below the floor surface portion 20 such as a floor mat so as not to affect the design of the vehicle compartment. The blower 52 is configured by an electric blower whose blowing capacity (for example, the number of revolutions) can be changed in accordance with a control signal from the control device 100 (to be described later). The blower 52 is connected to a suction duct 522 for suctioning the air from a vehicle interior air conditioning unit (not shown) and a seat duct 56.

The air blowing portion 54 is provided in the seat back portion 14. The air blowing portion 54 includes a center blowing portion 542 formed in the back support portion 144 of the seat back portion 14, and side blowing ports 544 and 546 formed on both outer sides of the seat back portion 14 in the seat width direction DR1 from the back support portion 144.

The center blowing port 542 is a blowing port for blowing the air toward the back of the seated occupant. The center blowing portion 542 is formed of multiple fine holes 542a provided in the back cover 142. Each of the fine holes 542a is provided as a ventilation hole having a diameter of about 1 mm.

The side blowing ports 544 and 546 are blowing ports for blowing the air toward the vicinity of the underarm and the side chest of the seated occupant. The side blowing ports 544 and 546 are disposed on both outer sides of the side support portion 146 of the seat back portion 14. More specifically, the side blowing ports 544 and 546 are formed in hollow blowing port providing portions 548 disposed on both outer sides of the side support portion 146 of the seat back portion 14.

The side blowing ports 544 and 546 are each provided with a wind direction adjustment unit 60 for adjusting the wind direction of the air blown out from the side blowing ports 544 and 546. The details of the wind direction adjustment unit 60 will be described later.

One end of the seat duct 56 on an air flow upstream side is connected to the blower 52, and the other end of the seat duct 56 on an air flow downstream side is connected to the air blowing portion 54. The seat duct 56 includes an inner duct portion 562 located inside the vehicle seat 1 and an outer duct portion 564 located outside the vehicle seat 1.

The inner duct portion 562 and the outer duct portion 564 are connected to each other. The inner duct portion 562 branches so as to communicate with each of the blowing ports 542, 544, and 546 configuring the air blowing portion 54. The outer duct portion 564 is formed of a concertina-shaped duct so as to be able to cope with the movement of the vehicle seat 1 in the vertical direction and the anteroposterior direction. The outer duct portion 564 may be formed of a duct other than a concertina-shaped duct as long as a duct has flexibility.

In the seat air conditioner 50 configured as described above, when the blower 52 is operated, the air blown out from the blower 52 is blown out from the respective blowing ports 542, 544, 546 configuring the air blowing portion 54.

Figure 4:
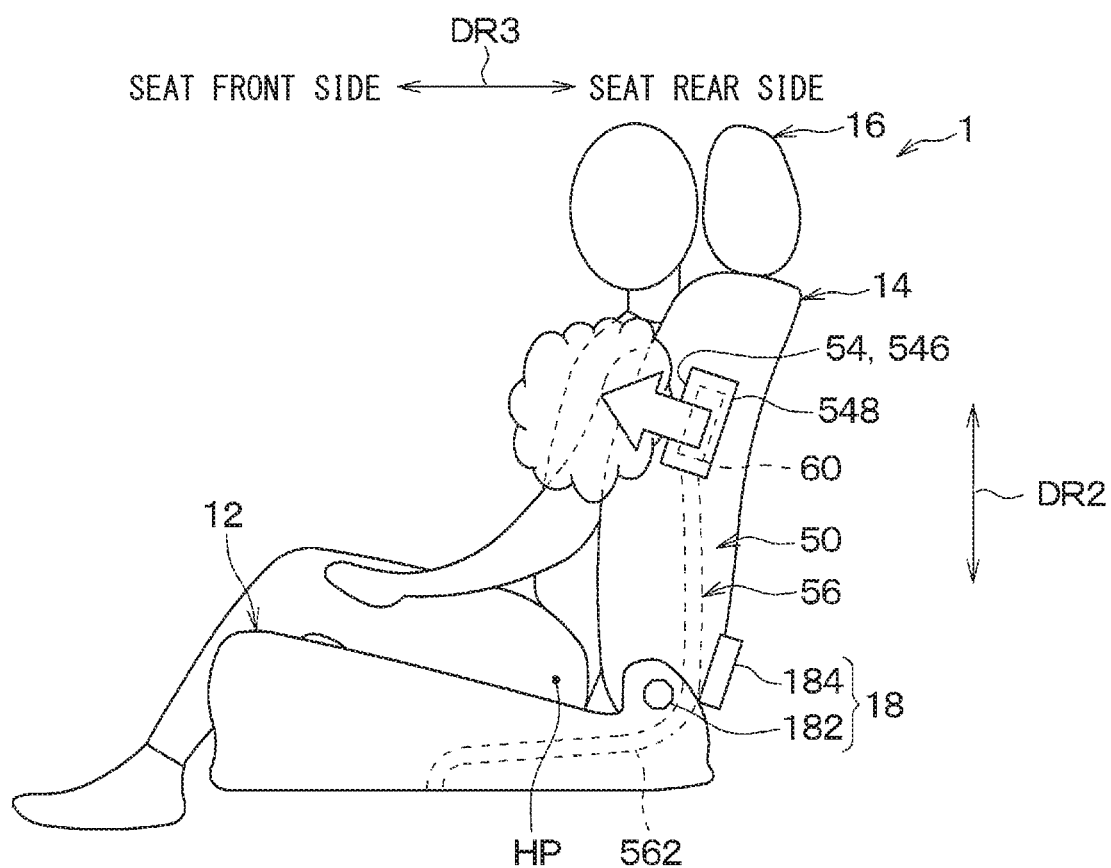
FIG. 4 is an illustrative view illustrating a wind direction of an air blown out from a side blowing port when the vehicle seat assumes a basic posture according to a first embodiment.

More specifically, when the reclining angle θr of the vehicle seat 1 is in the basic posture, as shown in FIG. 4, the air blown out from the blower 52 is blown out from the side blowing ports 544 and 546 toward the vicinity of the underarm and the side chest of the seated occupant.

Figure 5:
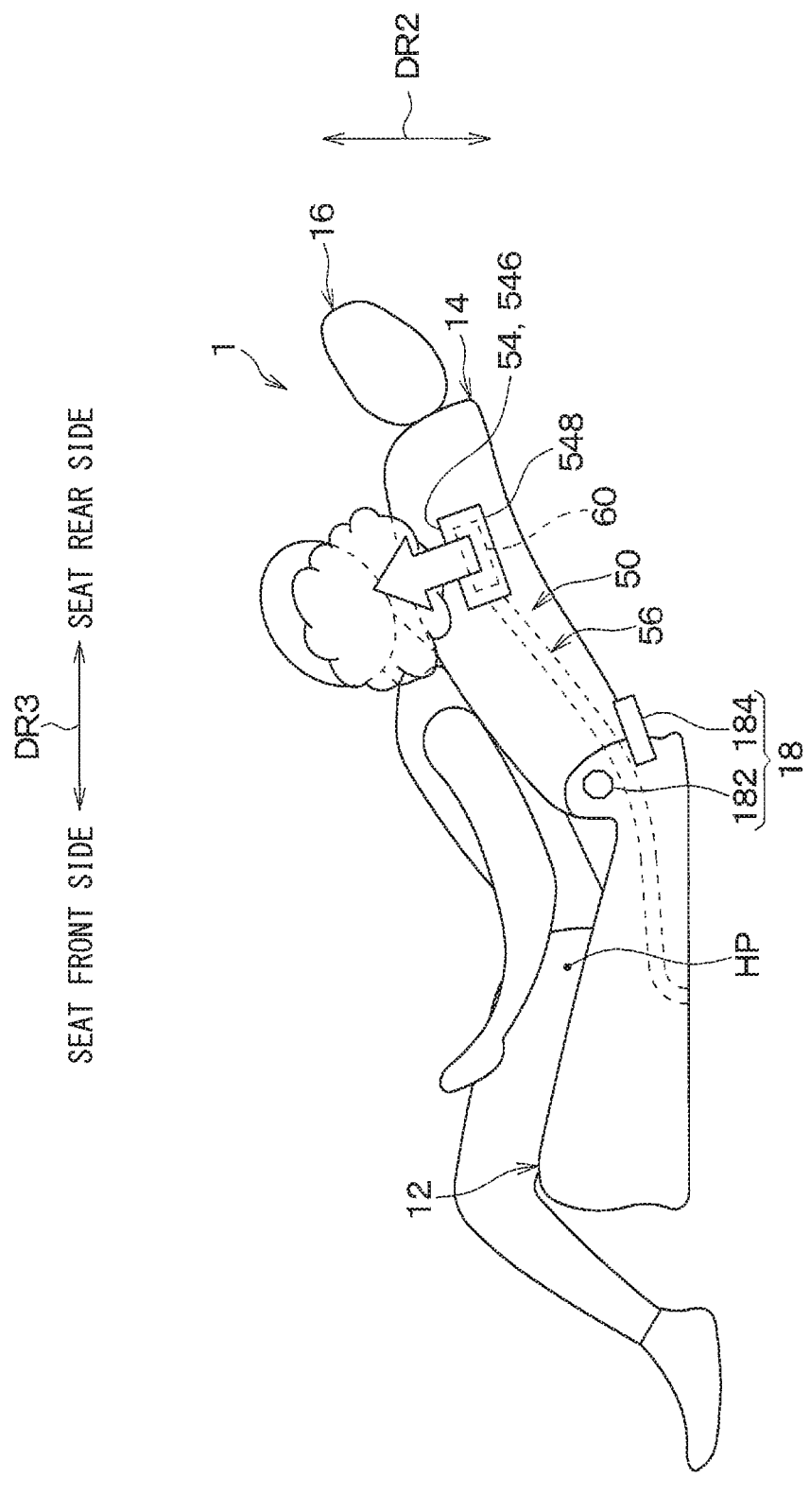
FIG. 5 is an illustrative view illustrating a wind direction of an air blown out from a side blowing port when a vehicle seat is in a full flat posture in a comparative example.

From this state, when the reclining angle θr of the vehicle seat 1 assumes the full flat posture, as shown in FIG. 5, the hip point HP of the seated occupant deviates to the seat front side. As a result, a relative positional relationship between the air blowing portion 54 and the seated occupant changes, and the air from the side blowing ports 544 and 546 is blown to the vicinity of a face part of the seated occupant, so that there is a concern that the comfort of the seated occupant is impaired.

Figure 6:
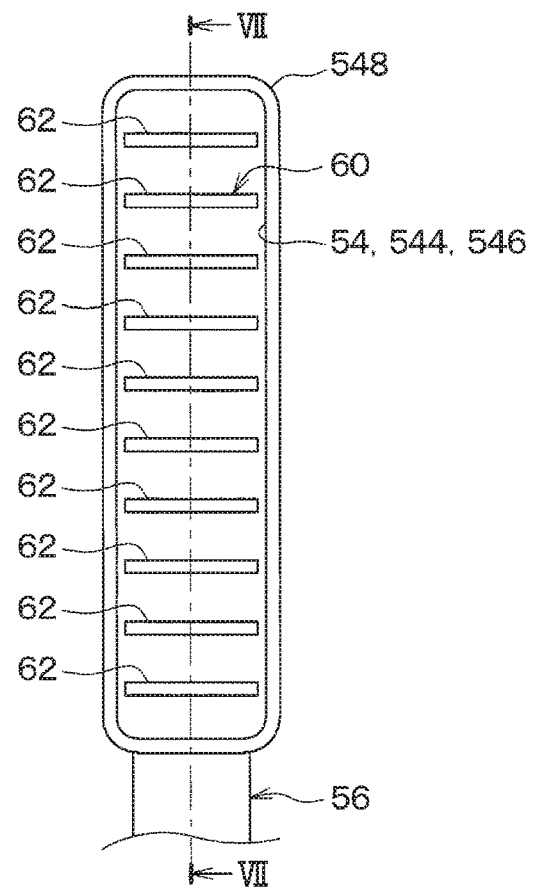
FIG. 6 is a front view of a side blowing port of a seat air conditioner according to a first embodiment.
Figure 7:
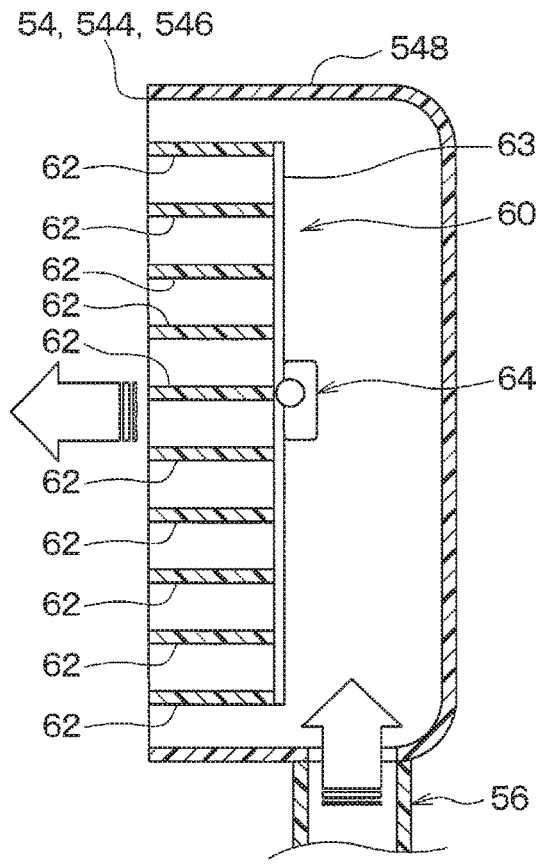
FIG. 7 is a cross-sectional view taken along a line VII-VII of FIG. 6.
Figure 8:
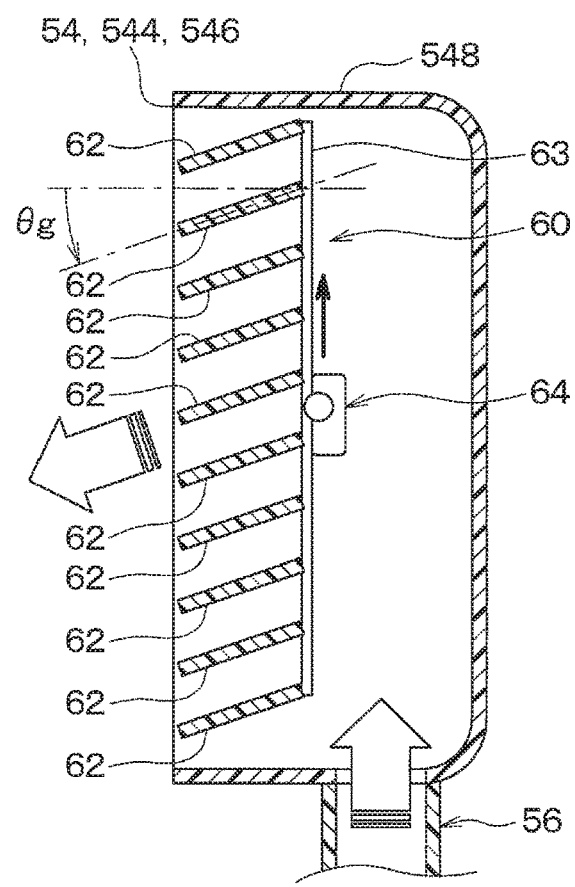
FIG. 8 is an illustrative view illustrating the operation of a wind direction adjustment unit in the side blowing port.

Therefore, as shown in FIGS. 6 to 8, the seat air conditioner 50 according to the present embodiment is provided with a wind direction adjustment unit 60 for adjusting the wind direction of the air blown out from the side blowing ports 544 and 546. The wind direction adjustment unit 60 adjusts the wind direction of the air blown out from the side blow blowing ports 544 and 546 so that the air from the side blowing ports 544 and 546 is blown out toward a specific part of the seated occupant regardless of the reclining angle θr when the seat back portion 14 is inclined toward the seat rear side.

The wind direction adjustment unit 60 includes multiple wind direction plates 62 that can vary the wind direction of the air blown out from the side blowing ports 544 and 546, an actuator 64 for outputting a driving force for operating the multiple wind direction plates 62, and a wind direction control unit 100b of the control device 100, which will be described later.

The wind direction plates 62 are disposed inside the side blowing ports 544 and 546 so as not to affect the design of the vehicle seat 1. The wind direction plates 62 are connected to each other by a coupling portion 63 so that their orientations are changed in conjunction with each other.

For example, as shown in FIGS. 7 and 8, the actuator 64 changes the wind direction of the air blown out from the side blowing ports 544 and 546 by sliding the coupling portion 63 in a direction intersecting with the air blowing direction and changing the adjustment angle θg of each of the wind direction plates 62. The output of the actuator 64 can be changed in accordance with a control signal from the control device 100. In the present embodiment, the inclination angle of the wind direction plates 62 with respect to the direction orthogonal to the blowing surfaces of the side blowing ports 544 and 546 is set as the adjustment angle θg of the wind direction plates 62.

Figure 9:
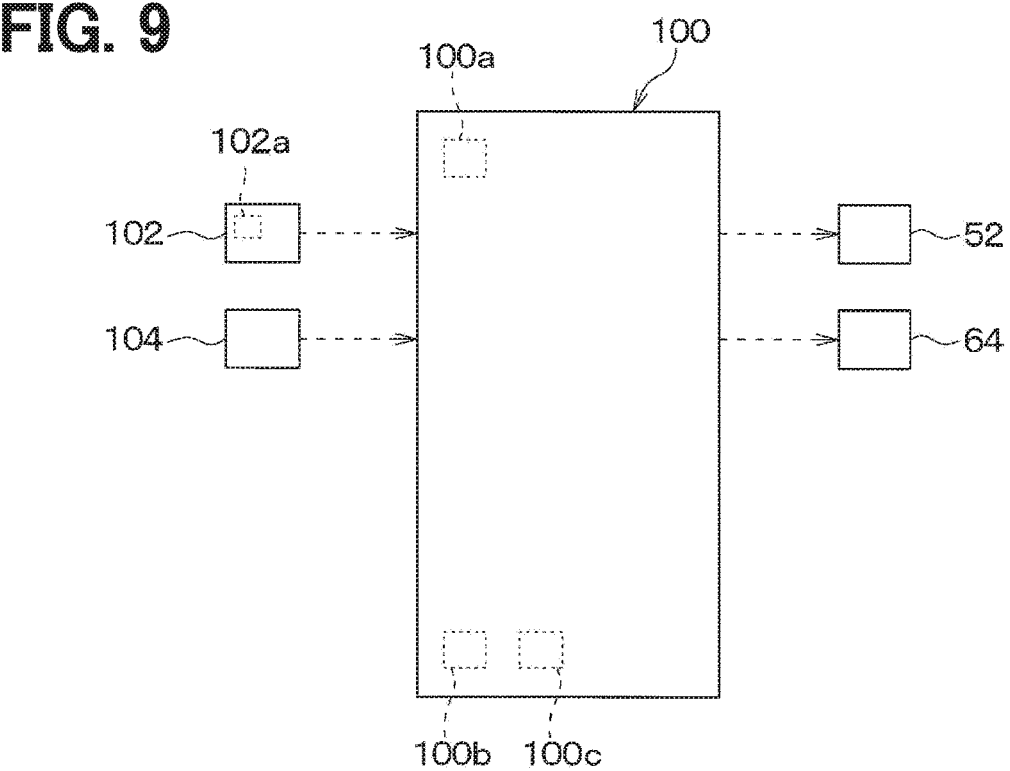
FIG. 9 is a block diagram showing a control device of the seat air conditioner according to the first embodiment.
Figure 10:
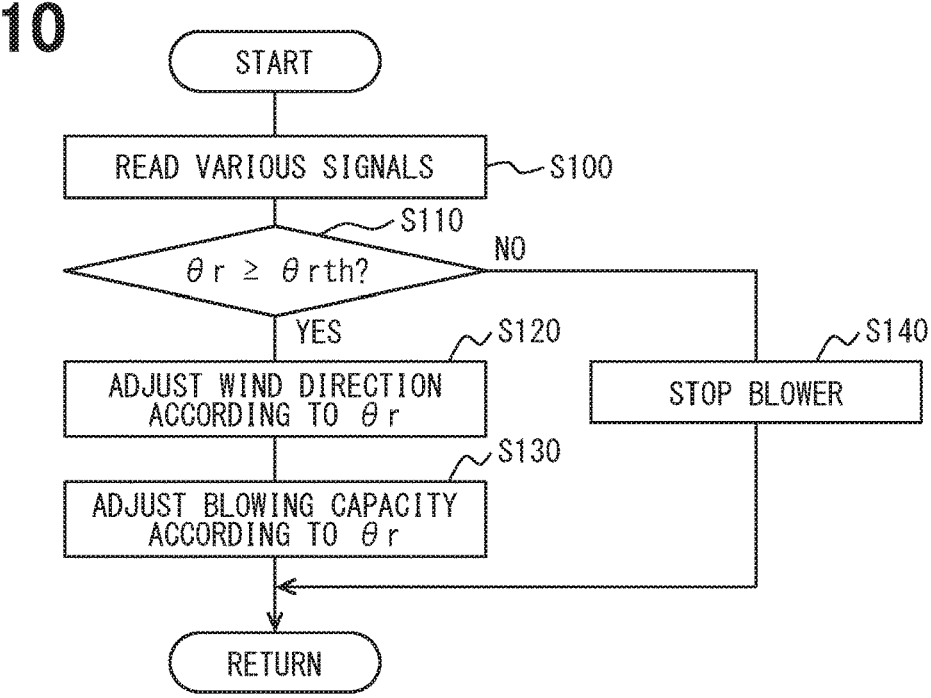
FIG. 10 is a flowchart showing a flow of a control process executed by a control device of the seat air conditioner according to the first embodiment.

Next, the control device 100 which is an electric control unit of the seat air conditioner 50 will be described with reference to FIG. 9. The control device 100 (commonly referred to as a controller) is formed by a microcontroller including a processor and a memory (for example, ROM, RAM) 100a, as well as peripheral circuits of the microcontroller. The control device 100 performs various calculations and processes based on a control program or control programs stored in the memory 100a, and controls the operation of various devices connected to the output side. The memory 100a of the control device 100 is a non-transitory tangible storage medium.

The control device 100 is a device for controlling the operation of the seat air conditioner 50. The output side of the control device 100 is connected to the blower 52, the actuator 64 of the wind direction adjustment unit 60, and the like.

An operation panel 102 disposed in the vicinity of an instrument panel of the vehicle is connected to an input side of the control device 100. The operation panel 102 is provided with a seat operation switch 102a and the like of the seat air conditioner 50 as various operation switches. The seat operation switch 102a is a switch for operating the blower 52 and outputting a request signal for blowing out air from the air blowing portion 54 to the control device 100.

A reclining sensor 104 for detecting the reclining angle θr of the vehicle seat 1 is connected to an input side of the control device 100. As the reclining sensor 104, for example, an angular sensor that detects the rotation angle of the electric motor 184 of the reclining mechanism portion 18 can be employed.

In this example, the control device 100 is configured integrally with a control unit for controlling various devices as control targets connected to the output side of the control device 100. In the control device 100, hardware and software for controlling the operation of each component as a control target function as a control unit for controlling the operation of each component.

For example, a configuration for controlling the actuator 64 of the wind direction adjustment unit 60 in the control device 100 functions as the wind direction control unit 100b for controlling the operation of the actuator 64. Further, a configuration for controlling the blowing capacity of the blower 52 in the control device 100 functions as the air volume control unit 100c.

Next, the operation of the seat air conditioner 50 according to the present embodiment will be described. When the seat operation switch 102a is turned on in a state in which a vehicle interior air conditioning unit (not shown) is operating, the seat air conditioner 50 executes a control process of blowing out the air from the air blowing portion 54.

Hereinafter, a control process executed by the seat air conditioner 50 according to the present embodiment will be described with reference to FIG. 11. The control process shown in FIG. 11 is periodically or irregularly executed by the control device 100.

Figure 11:
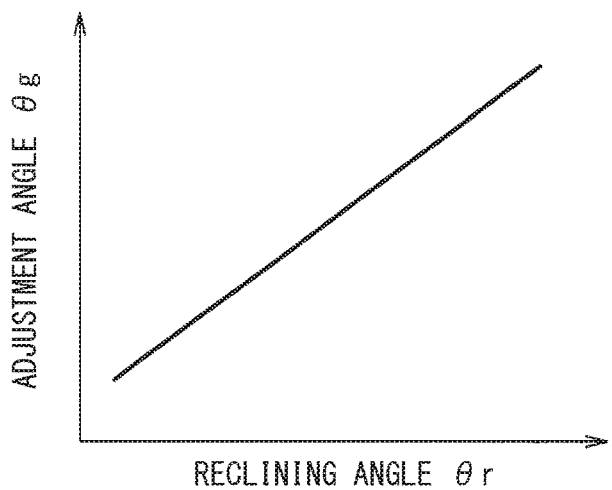
FIG. 11 is an illustrative view illustrating a relationship between a reclining angle and an adjustment angle of a wind direction plate according to the first embodiment.

As shown in FIG. 11, the control device 100 reads various signals such as detection signals of the reclining sensor 104 connected to the input side in Step S100. Then, in Step S110, the control device 100 determines whether or not the reclining angle θr detected by the reclining sensor 104 is equal to or larger than a predetermined reference angle θrth. The reference angle θrth is set to an angle at which the reclining angle θr becomes an acute angle (that is, θrth<90°). The reference angle θrth can be set to, for example, a reclining angle θrs when the vehicle seat 1 is in an accommodation posture.

When the reclining angle θr is equal to or larger than the reference angle θrth, the control device 100 adjusts the wind direction of the air blown out from the side blowing ports 544 and 546 in accordance with the reclining angle θr when the seat back portion 14 is inclined toward the rear side of the seat in Step S120. In other words, the control device 100 controls the adjustment angle θg of each of the wind direction plates 62 so that the wind direction of the air blown out from the side blowing ports 544 and 546 is inclined toward the front side of the seat as the reclining angle increases.

Specifically, the control device 100 refers to a control map in which a correspondence relationship between the reclining angle θr and the adjustment angle θg of the wind direction plates 62 shown in FIG. 11 is defined, and controls the actuator 64 so as to have the adjustment angle θg corresponding to the reclining angle θr. In other words, as shown in FIG. 11, the control device 100 controls the actuator 64 so that the adjustment angle θg of each of the wind direction plates 62 increases as the reclining angle θr increases. Although FIG. 11 exemplifies the control map in which the adjustment angle θg of each of the wind direction plates 62 increases in proportion to the reclining angle θr, the present disclosure is not limited to the above example. For example, the control device 100 may be configured to control the actuator 64 with reference to the control map that is set so that the adjustment angle θg of each of the wind direction plates 62 gradually increases as the reclining angle θr increases.

Figure 12:
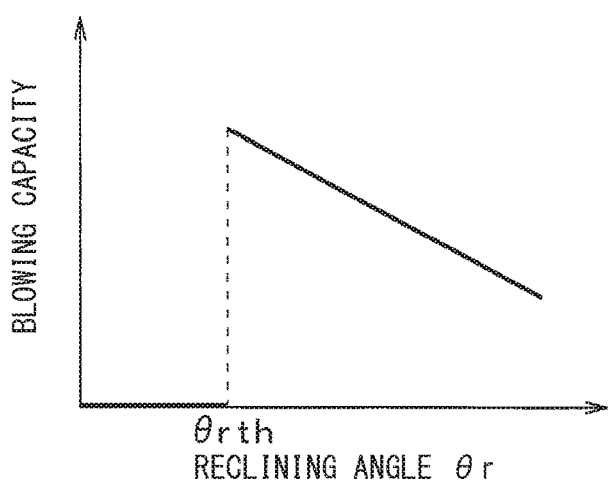
FIG. 12 is an illustrative view illustrating a relationship between a reclining angle and a blowing capacity of a blower according to the first embodiment.

Subsequently, in Step S130, the control device 100 adjusts the blowing capacity of the blower 52 in accordance with the reclining angle θr. Specifically, the control device 100 refers to a control map in which a correspondence relationship between the reclining angle θr and the blowing capacity of the blower 52 shown in FIG. 12 is defined, and controls the blower 52 so as to have the blowing capacity corresponding to the reclining angle θr. In other words, as shown in FIG. 12, the control device 100 controls the blower 52 so that the blowing capacity decreases as the reclining angle θr increases. Although FIG. 12 illustrates a control map in which a blowing stress of the blower 52 decreases in proportion to the reclining angle θr, the present disclosure is not limited to the above example. For example, the control device 100 may be configured to control the blower 52 with reference to a control map set so that the blowing capacity gradually decreases as the reclining angle θr increases.

Figure 13:
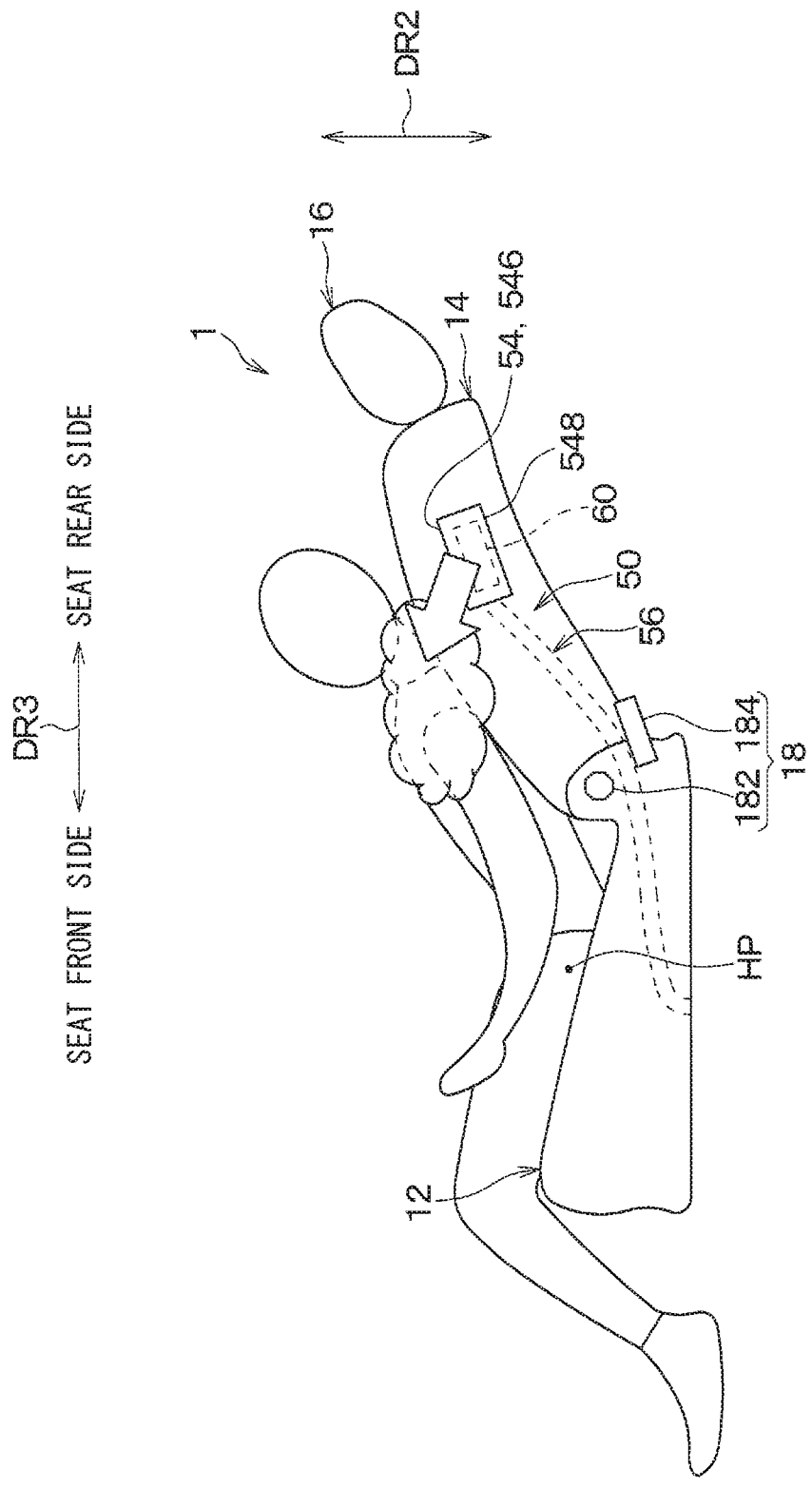
FIG. 13 is an illustrative view illustrating a wind direction of an air blown out from the side blowing port when the vehicle seat is in a full flat posture according to the first embodiment.

As described above, when the reclining angle θr is equal to or larger than the reference angle θrth, the adjustment angle θg of each of the wind direction plates 62 increases as the reclining angle θr increases. For that reason, for example, as shown in FIG. 13, even when the vehicle seat 1 is in the full flat posture, the air blown out from the blower 52 is blown out from the side blowing ports 544 and 546 toward the vicinity of the underarm and the side chest of the seated occupant.

The above processing is the processing executed by the control device 100 when the reclining angle θr is equal to or larger than the reference angle θrth. Hereinafter, processing to be executed by the control device 100 when the reclining angle θr is less than the reference angle θrth will be described.

When the reclining angle θr is less than the reference angle θrth, the control device 100 stops the operation of the blower 52 in Step S140. This is because it is considered that the occupant is not seated on the vehicle seat 1 when the reclining angle θr is less than the reference angle θrth. Although an example in which the operation of the blower 52 is stopped in Step S140 has been described, the present disclosure is not limited to the above example. For example, when the reclining angle θr is less than the reference angle θrth, the control device 100 may be configured to lower the blowing capacity of the blower 52 as compared with the case where the reclining angle θr is equal to or greater than the reference angle θrth.

In the seat air conditioner 50 described above, the wind direction of the air blown out from the side blowing ports 544 and 546 is inclined toward the front side of the seat by the wind direction adjustment unit 60 as the reclining angle θr increases.

To more clearly appreciate the advantages and effects of the present embodiment, consider that generally, a vehicle seat air conditioner includes air blowing ports for blowing air to a seated occupant. However, some seated occupants feel uncomfortable if air is blown to their face and abdomen. For that reason, it may be desirable for the seat air conditioner to be configured to blow out an air to a part of the seated occupant (for example, a side chest) while avoiding uncomfortable areas. However, in many cases, vehicle seats are able to adjust a reclining angle, which is an inclination angle of a seat back portion with respect to a seat cushion portion. The seat back portion is a member of the seat which serves as a backrest of the seated occupant. The seat cushion portion is a member for supporting a lower body of the seated occupant in the seat.

In a seat with a reclining function, when the seat back portion of the seat is inclined to a seat rear side, a position of the buttock or the back of the seated occupant may deviate toward the front. In that case, a relative positional relationship between the air blowing portion and the seated occupant changes, and the air from the air blowing portion may be blown to the vicinity of the face of the seated occupant. In this case, the seated occupant may feel uncomfortable.

In this regard, according to the above configuration described with respect to the present embodiment, even if the seat back portion 14 is inclined to the rear side of the seat and the position of the buttock or the back of the seated occupant is deviated to the front side of the seat, the wind direction of the air blown out from the side blowing ports 544 and 546 is changed to be inclined to the front side of the seat so as to follow the deviated position. As a result, when the seat back portion 14 is inclined toward the rear side of the seat, the air is inhibited from being blown out toward a part of the seated occupant where the seated occupant feels uncomfortable, so that the comfort of the seated occupant can be ensured.

In the present embodiment, the wind direction adjustment unit 60 is provided only in the side blowing ports 544 and 546 of the air blowing portion 54 for the following reason.

The side blowing ports 544 and 546 provided on the outer side of the vehicle seat 1 in the seat width direction DR1 are less likely to be covered by the seated occupant than the center blowing port 542 provided at the center of the vehicle seat 1, and the wind direction of the air blown out from the blowing ports is easily changed.

For that reason, in the present embodiment, the wind direction adjustment unit 60 is provided for the side blowing ports 544 and 546 of the air blowing portion 54, and the wind direction of the air blown out from the side blowing ports 544 and 546 is changed in accordance with the reclining angle θr. According to the above configuration, when the seat back portion is inclined toward the rear side of the seat, the air can be blown while avoiding a part of the seated occupant who feels uncomfortable, and therefore, the comfort of the seated occupant can be ensured.

The wind direction adjustment unit 60 according to the present embodiment is disposed inside the side blowing ports 544 and 546. According to the above configuration, since the appearance of the vehicle seat 1 does not change when the wind direction of the air blown out from the side blowing ports 544 and 546 is changed, the design of the vehicle seat 1 can be ensured.

Incidentally, when the seated occupant wants to relax, the seated occupant tends to increase the reclining angle θr of the vehicle seat 1. Nevertheless, if a large amount of air is blown toward the seated occupant, the seated occupant may feel uncomfortable.

On the other hand, the seat air conditioner according to the present embodiment is configured to reduce the amount of air blown out from the air blowing portion 54 as the reclining angle θr increases, so that the comfort of the seated occupant can be ensured.

Further, as the reclining angle θr of the vehicle seat 1 increases, the positions of the buttocks and the back of the seated occupant greatly deviate toward the front side of the seat. For that reason, with a reduction in the amount of air blown out from the air blowing portion 54 as the reclining angle θr increases, a large amount of air can be also inhibited from being blown out toward a part of the seated occupant who feels uncomfortable.

Further, in the seat air conditioner 50 according to the present embodiment, when the reclining angle θr is an acute angle and a person is not seated on the vehicle seat 1, the blowing capacity of the blower is lowered as compared with the case where the reclining angle θr is an obtuse angle. This makes it possible to inhibit wasteful operation of the blower 52.

Second Embodiment

Next, a second embodiment will be described with reference to FIGS. 14 to 16. The present embodiment differs from the first embodiment in that a wind direction adjustment unit 60A is configured to rotate a blowing port providing portion 548 which provides side blowing ports 544 and 546.

Figure 14:
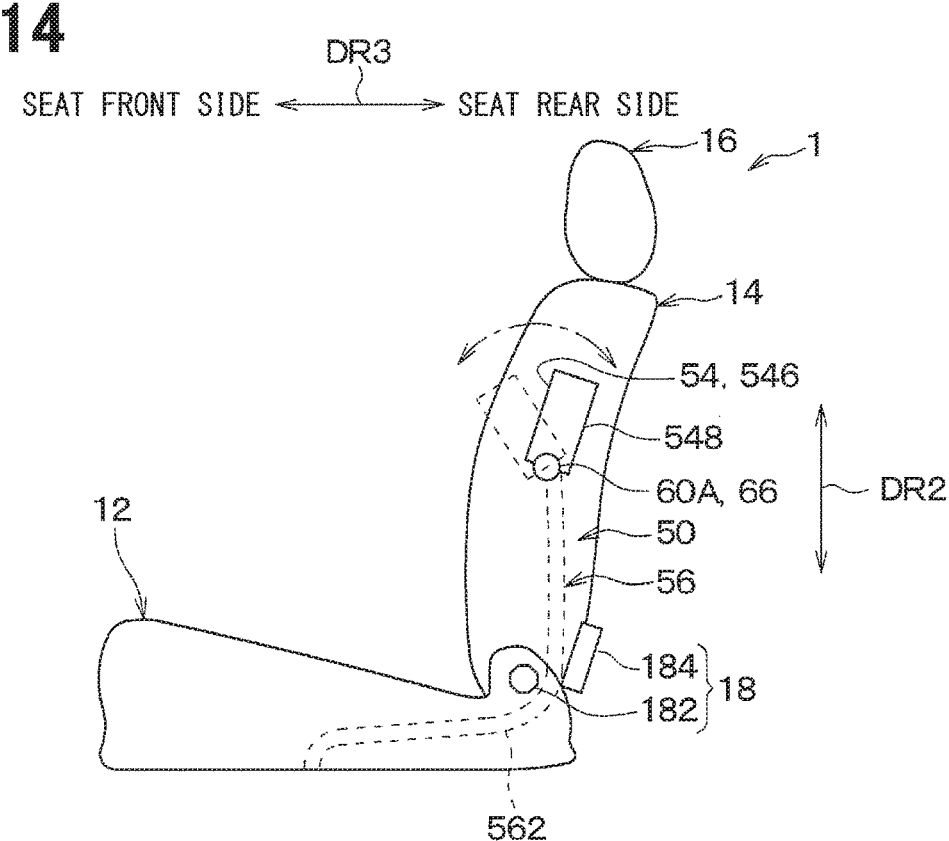
FIG. 14 is a schematic configuration diagram of a vehicle seat including a seat air conditioner according to a second embodiment.

As shown in FIG. 14, the wind direction adjustment unit 60A includes an actuator 66 for rotating the blowing port providing portion 548. Although not shown, a lower end of the blowing port providing portion 548 is rotatably supported with respect to a rotation shaft of an actuator 66. The wind direction adjustment unit 60A according to the present embodiment does not include an actuator 64 for driving each of the wind direction plates 62.

The actuator 66 changes the wind direction of the air blown out from the side blowing ports 544 and 546 by rotating the blowing port providing portion 548 between a solid line position and a dashed line position in FIG. 14. An output of the actuator 66 can be changed in accordance with a control signal from a control device 100.

When a reclining angle θr is equal to or larger than a reference angle θrth, the control device 100 according to the present embodiment controls the actuator 66 so that the wind direction of the air blown out from the side blowing ports 544 and 546 is inclined toward the front side of the seat in accordance with the reclining angle θr. More specifically, the control device 100 controls the actuator 66 so that the blowing port providing portion 548 comes closer to a position indicated by a dashed line in FIG. 14 as the reclining angle θr increases.

In the seat air conditioner 50 configured as described above, when the blower 52 is operated, the air blown out from the blower 52 is blown out from the respective blowing ports 542, 544, 546 configuring the air blowing portion 54.

Figure 15:
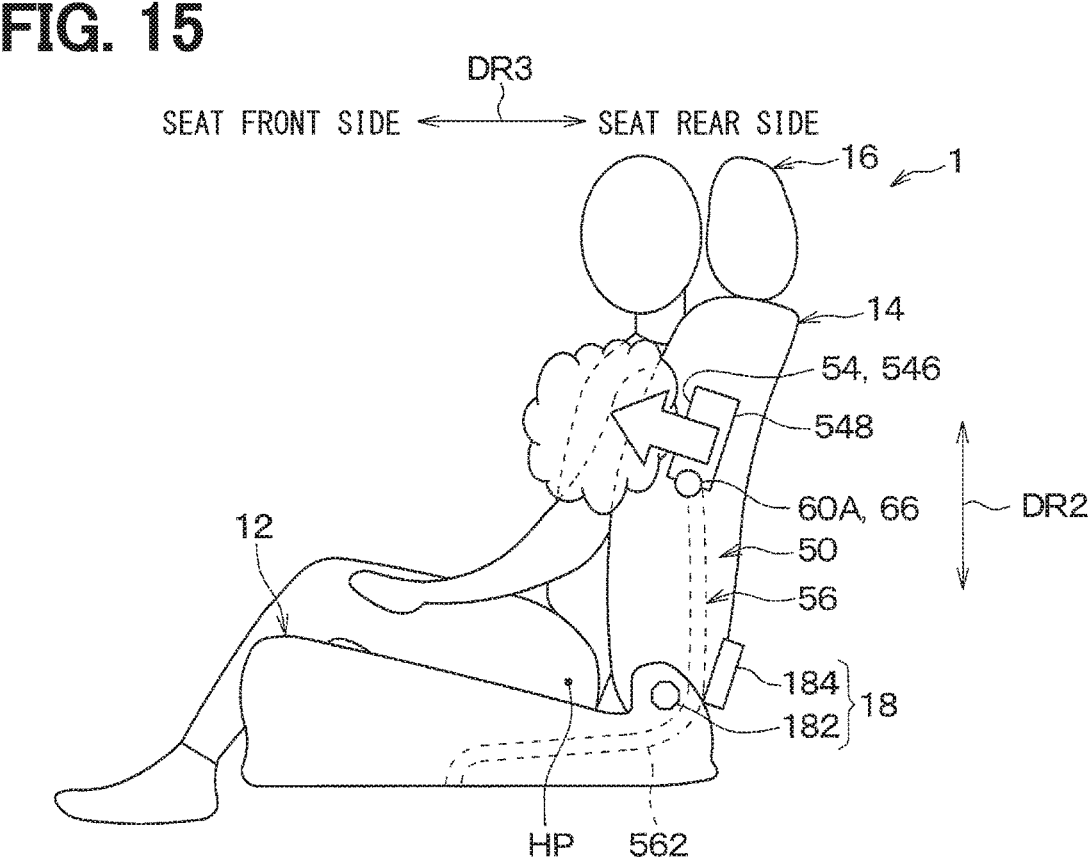
FIG. 15 is an illustrative view illustrating a wind direction of an air blown out from a side blowing port when the vehicle seat assumes a basic posture according to the second embodiment.

More specifically, when the reclining angle θr of the vehicle seat 1 is in a basic posture, as shown in FIG. 15, the air blown out from the blower 52 is blown out from the side blowing ports 544 and 546 toward the vicinity of the underarm and the side chest of the seated occupant.

Figure 16:
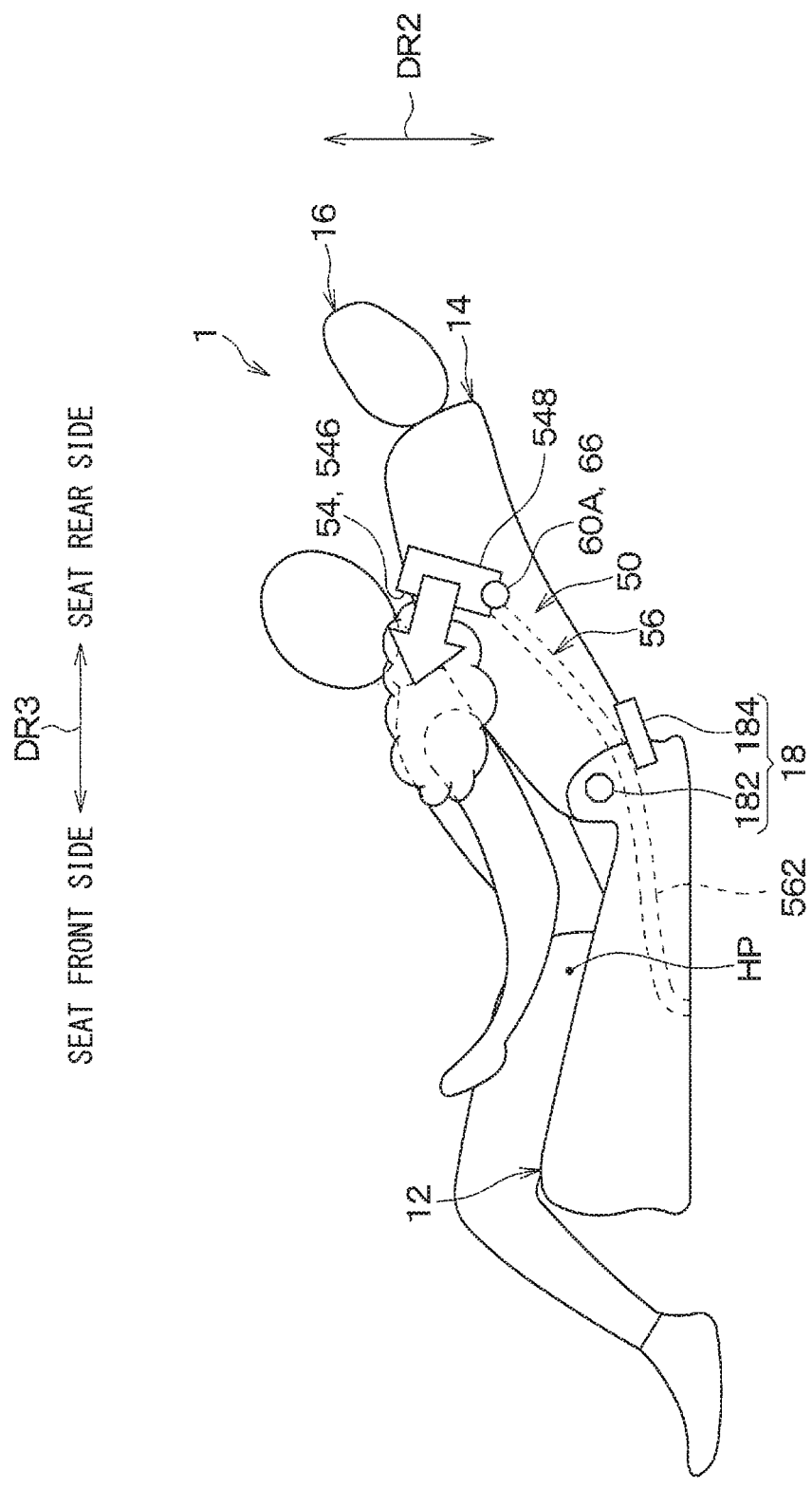
FIG. 16 is an illustrative view illustrating the wind direction of the air blown out from the side blowing port when the vehicle seat assumes a full flat posture according to the second embodiment.

When the reclining angle θr of the vehicle seat 1 changes to a full flat posture from this state, as shown in FIG. 16, the blowing port providing portion 548 is rotationally displaced by the actuator 66. As a result, even if the vehicle seat 1 is in the full flat posture, the air blown out from the blower 52 is blown out from the side blowing ports 544 and 546 toward the vicinity of the underarm and the side chest of the seated occupant.

Other configurations and operations are the same as those of the first embodiment. The seat air conditioner 50 according to the present embodiment can obtain the same operation and effects as those of the first embodiment, which are obtained from the same configuration, operation, and the like as those of the first embodiment.

Third Embodiment

Next, a third embodiment will be described with reference to FIGS. 17 to 20. The present embodiment differs from the first embodiment in that a blowing capacity of a blower 52 is changed in accordance with a body size of a seated occupant.

Figure 17:
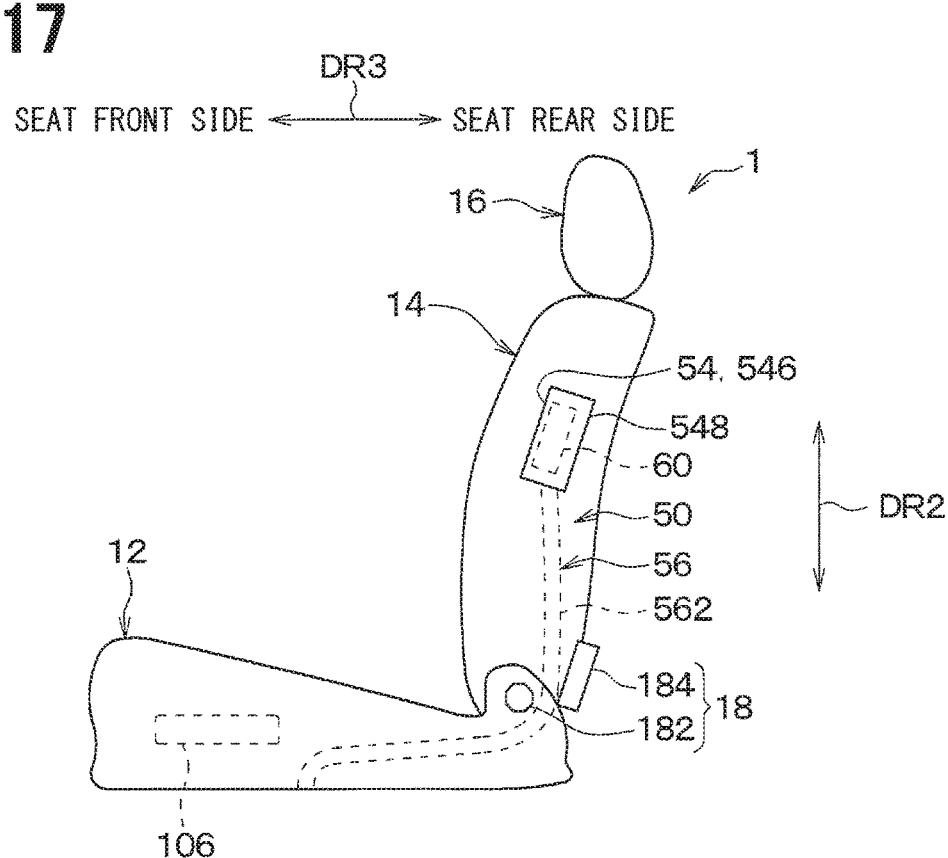
FIG. 17 is a schematic configuration diagram of a vehicle seat including a seat air conditioner according to a third embodiment.

As shown in FIG. 17, in a seat air conditioner 50 according to the present embodiment, a weight sensor 106 for detecting a weight of the seated occupant is disposed inside a seat back portion 14. The weight sensor 106 functions as a body size estimation unit that estimates the body size of the seated occupant.

Figure 18:
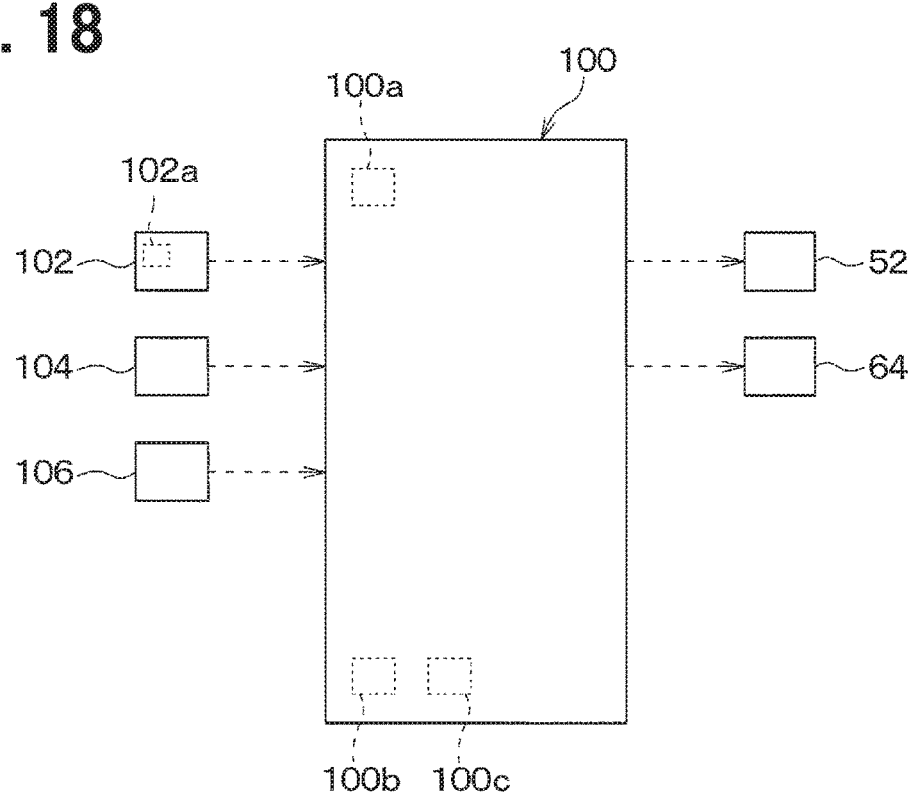
FIG. 18 is a block diagram showing a control device of the seat air conditioner according to the third embodiment.

As shown in FIG. 18, the weight sensor 106 is connected to an input side of a control device 100. The control device 100 estimates the body size of the seated occupant from the weight of the seated occupant detected by the weight sensor 106. For example, the control device 100 presumes that the body size of the seated occupant is a standard body size (that is, a standard body size) when the body weight of the seated occupant falls within a standard range, for example, when the reference range is before and after an average body weight of adult persons. Further, the control device 100 estimates that the body size of the seated occupant is a small body size when the body weight of the seated occupant is smaller than the reference range, and estimates that the body size of the seated occupant is a large body size when the body weight of the seated occupant is larger than the reference range. The control device 100 may be configured to estimate the body size of the seated occupant by another method instead of the method described above. For example, the control device 100 may be configured to estimate the body size of the seated occupant based on an image of the seated occupant captured by a camera installed in the vehicle.

In this example, a seated occupant having a small body size tends to be easily filled in a warm sense even if the amount of air blown out from the air blowing portion 54 is small as compared with a seated occupant having a large body size. In view of such a tendency, the control device 100 according to the present embodiment is configured to adjust the blowing capacity of the blower 52 according to the body size of the seated occupant.

Hereinafter, a control process of the blowing capacity of the blower 52 to be executed by the control device 100 according to the present embodiment will be described with reference to a flowchart shown in FIG. 19. The control process shown in FIG. 19 is a process executed by the control device 100 when the process proceeds to Step S130 of FIG. 10.

Figure 19:
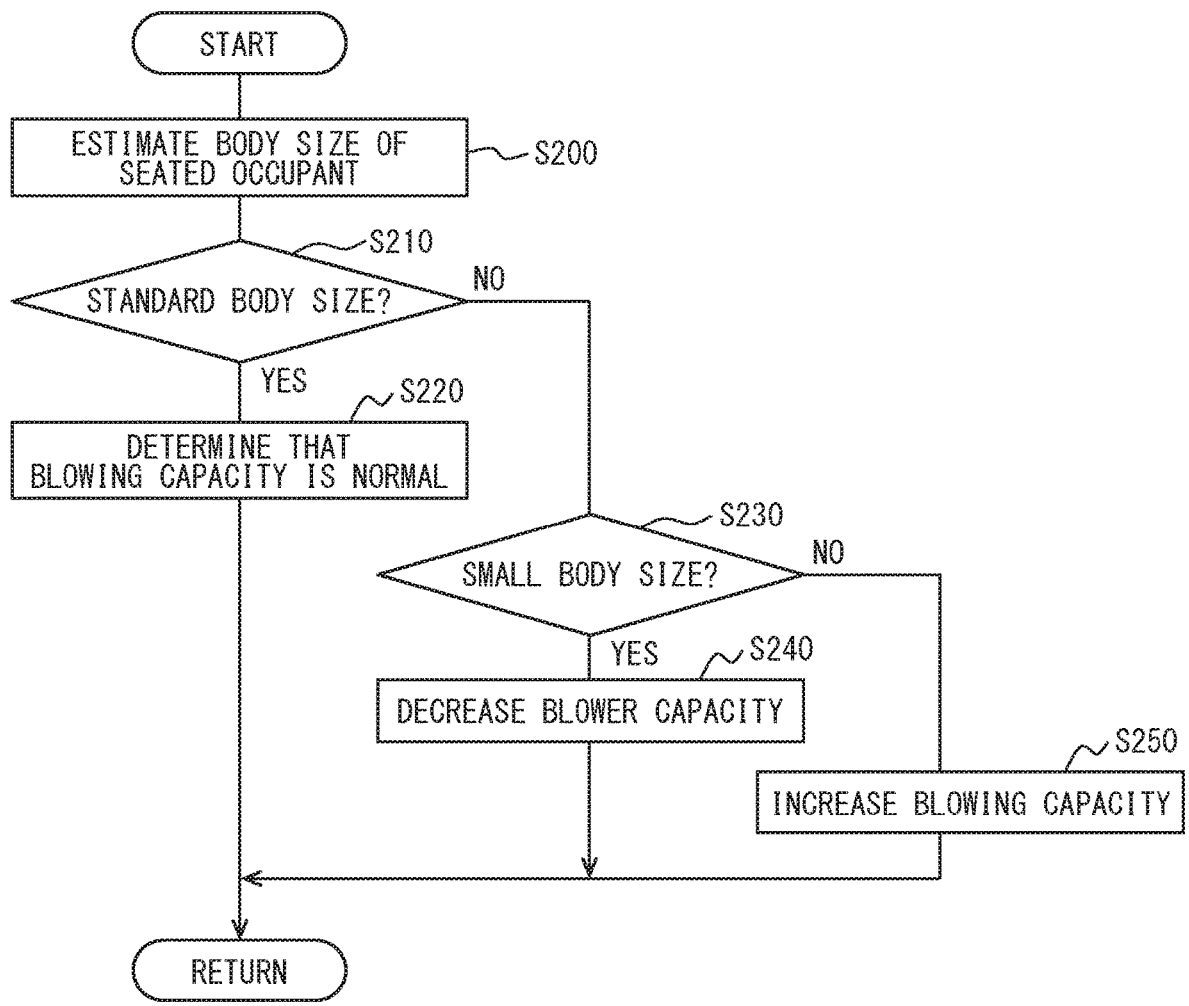
FIG. 19 is a flowchart showing a flow of a blowing control process executed by a control device of the seat air conditioner according to the third embodiment.

As shown in FIG. 19, in Step S200, the control device 100 estimates the body size of the seated occupant from the weight of the seated occupant detected by the weight sensor 106. The estimation method of the body size of the seated occupant is the method described above, and therefore a description of the method will be omitted.

Subsequently, in Step S210, the control device 100 determines whether or not the seated occupant is of a normal body size, that is, whether or not the seated occupant is of a predetermined reference body size. As a result, when the body size of the seated occupant is equal to the reference body size, the control device 100 determines the blowing capacity of the blower 52 as the standard blowing capacity in Step S220.

Figure 20:
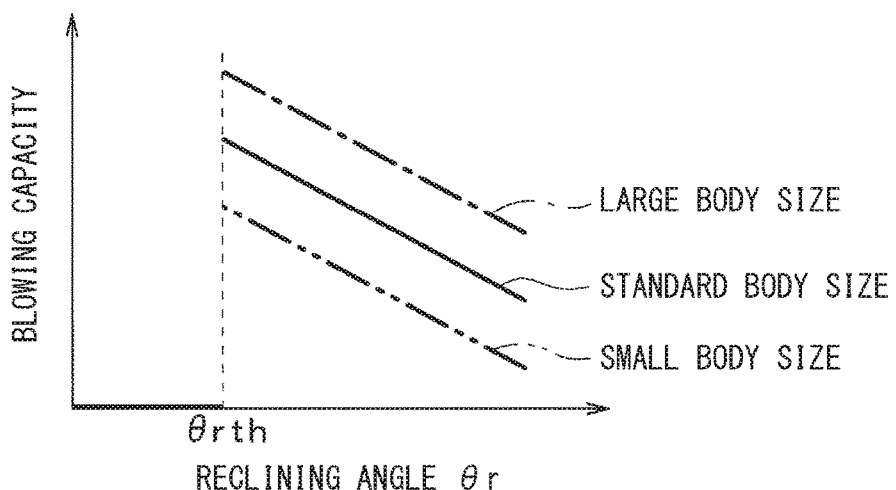
FIG. 20 is an illustrative view illustrating a relationship between a reclining angle and a blowing capacity of a blower according to the third embodiment.

Specifically, the control device 100 refers to a solid line portion of a control map in which the correspondence relationship between the reclining angle θr and the blowing capacity of the blower 52 shown in FIG. 20 is defined, and controls the blower 52 so as to have the blowing capacity corresponding to the reclining angle θr. In other words, as indicated by a solid line in FIG. 20, the control device 100 controls the blower 52 so that the blowing capacity decreases as the reclining angle θr increases. Although FIG. 20 illustrates a control map in which a blowing stress of the blower 52 decreases in proportion to the reclining angle θr, the present disclosure is not limited to the above example. For example, the control device 100 may be configured to control the blower 52 with reference to a control map set so that the blowing capacity gradually decreases as the reclining angle θr increases. This also applies to the process of Step S240 and S250 which will be described later.

On the other hand, when the body size of the seated occupant is not the reference body size, the control device 100 determines whether or not the seated occupant is a small body size, that is, whether or not the body size of the seated occupant is smaller than the reference body size in Step S230.

As a result, when the body size of the seated occupant is smaller than the reference body size, the control device 100 lowers the blowing capacity of the blower 52 in Step S240 as compared with the case where the body size of the seated occupant is equal to or larger than the reference body size.

More specifically, the control device 100 refers to a two-dot chain line portion of a control map in which the correspondence relationship between the reclining angle θr and the blowing capacity of the blower 52 shown in FIG. 20 is defined, and controls the blower 52 so as to have the blowing capacity corresponding to the reclining angle θr. In other words, as indicated by a two-dot chain line in FIG. 20, the control device 100 controls the blower 52 so that the blowing capacity decreases as the reclining angle θr increases.

On the other hand, when the body size of the seated occupant is larger than the reference body size, the control device 100 increases the blowing capacity of the blower 52 in Step S250 as compared with the case where the body size of the seated occupant is smaller than the reference body size.

More specifically, the control device 100 refers to a one-turn chain line portion of a control map in which the correspondence relationship between the reclining angle θr and the blowing capacity of the blower 52 shown in FIG. 20 is defined, and controls the blower 52 so as to have the blowing capacity corresponding to the reclining angle θr. In other words, as indicated by a one-dot chain line in FIG. 20, the control device 100 controls the blower 52 so that the blowing capacity decreases as the reclining angle θr increases.

Other configurations and operations are the same as those of the first embodiment. The seat air conditioner 50 according to the present embodiment can obtain the same operation and effects as those of the first embodiment, which are obtained from the same configuration, operation, and the like as those of the first embodiment.

In particular, in the seat air conditioner 50 according to the present embodiment, when the body size of the seated occupant is small, the blowing capacity of the blower is lowered as compared with the case where the body size of the seated occupant is large, and therefore, wasteful operation of the blower 52 can be reduced while securing the comfort of the seated occupant.

Other Embodiments

Although representative embodiments of the present disclosure have been described above, the present disclosure is not limited to the embodiments described above, and various modifications can be made, for example, as follows.

In each of the embodiments described above, an example in which the wind direction adjustment unit 60 is provided for the side blowing ports 544 and 546 in the air blowing portion 54 provided in the seat back portion 14 has been described, but the present disclose is not limited to the above configuration. In the seat air conditioner 50, for example, the wind direction adjustment unit 60 may be provided to at least one of the blowing ports 542, 544, and 546 configuring the air blowing portion 54 provided in the seat back portion 14.

In each of the embodiments described above, an example in which the wind direction adjustment unit 60 is provided in the air blowing portion 54 provided in the seat back portion 14 has been described, but the present disclosure is not limited to the above example. As described in the first embodiment described above, when the reclining angle θr of the vehicle seat 1 is in the full flat posture, the hip point HP of the seated occupant deviates to the seat front side.

Figure 21:
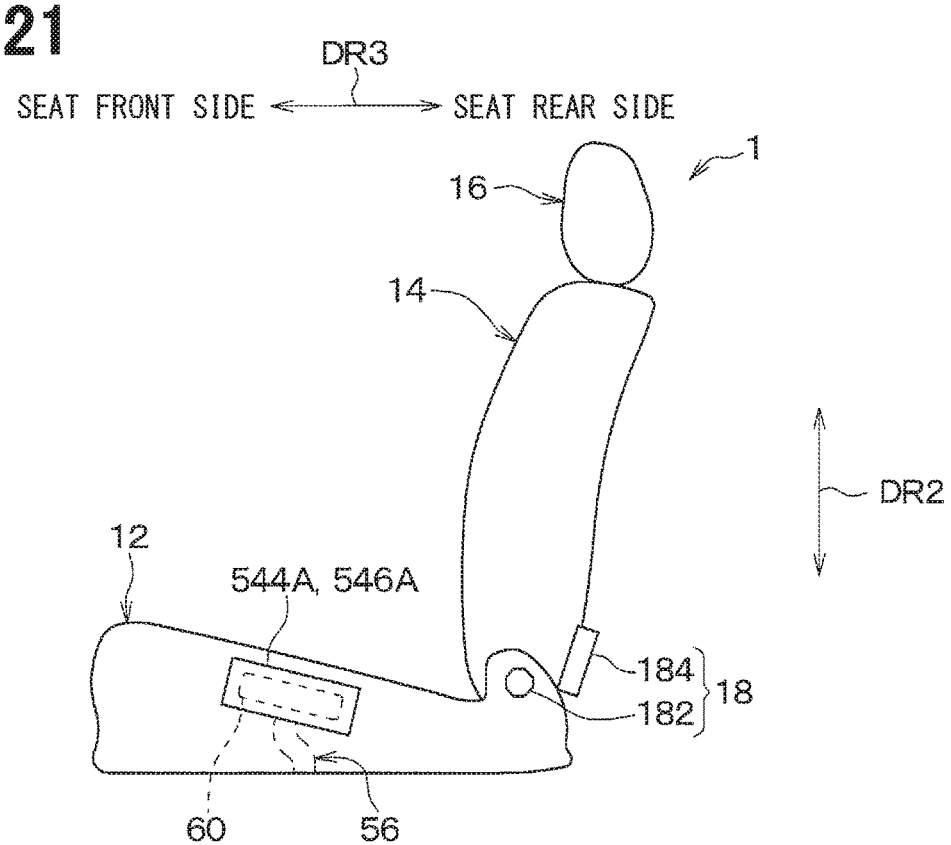
FIG. 21 is a schematic configuration diagram of a vehicle seat including a seat air conditioner according to another embodiment.

For example, as shown in FIG. 21, if the seat cushion portion 12 is provided with side blowing ports 544A and 546A for blowing the air toward the vicinity of thighs of the seated occupant, there is a concern that the comfort of the seated occupant may be impaired by a change in the reclining angle θr.

Figure 22:
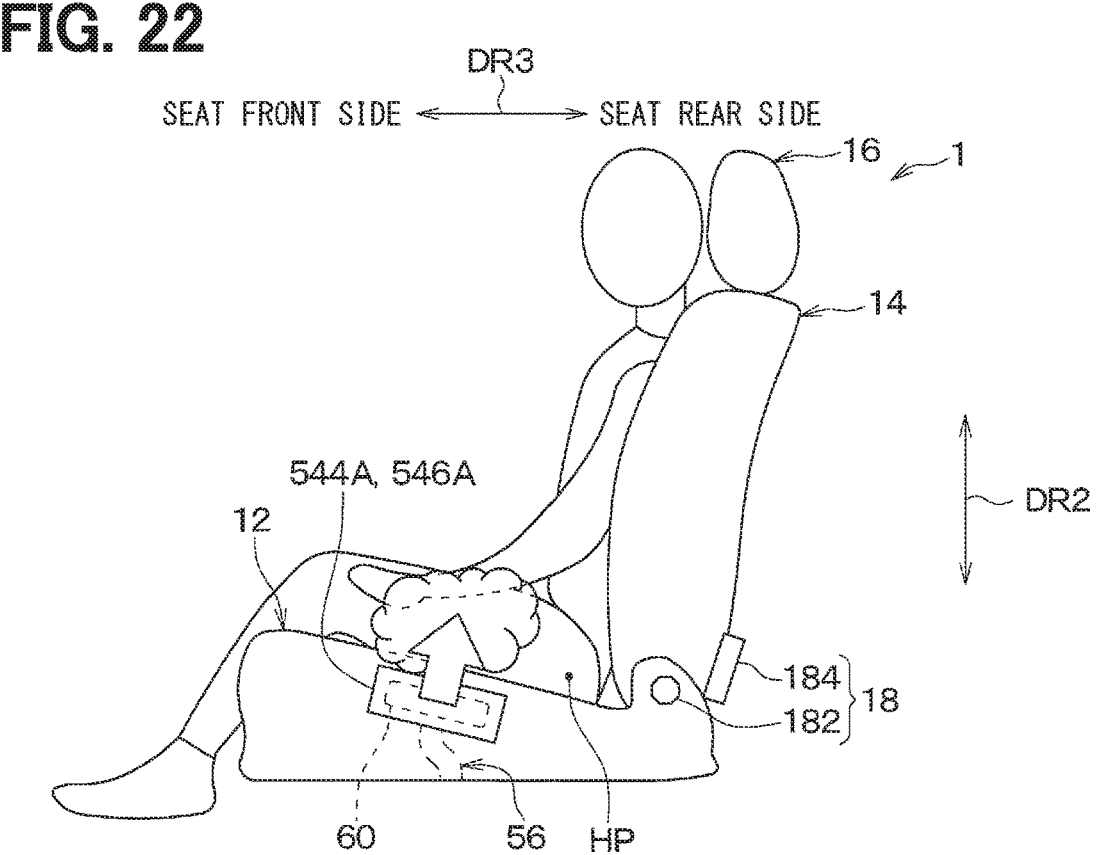
FIG. 22 is an illustrative view illustrating a wind direction of an air blown out from a side blowing port when the vehicle seat assumes a basic posture according to another embodiment.
Figure 23:
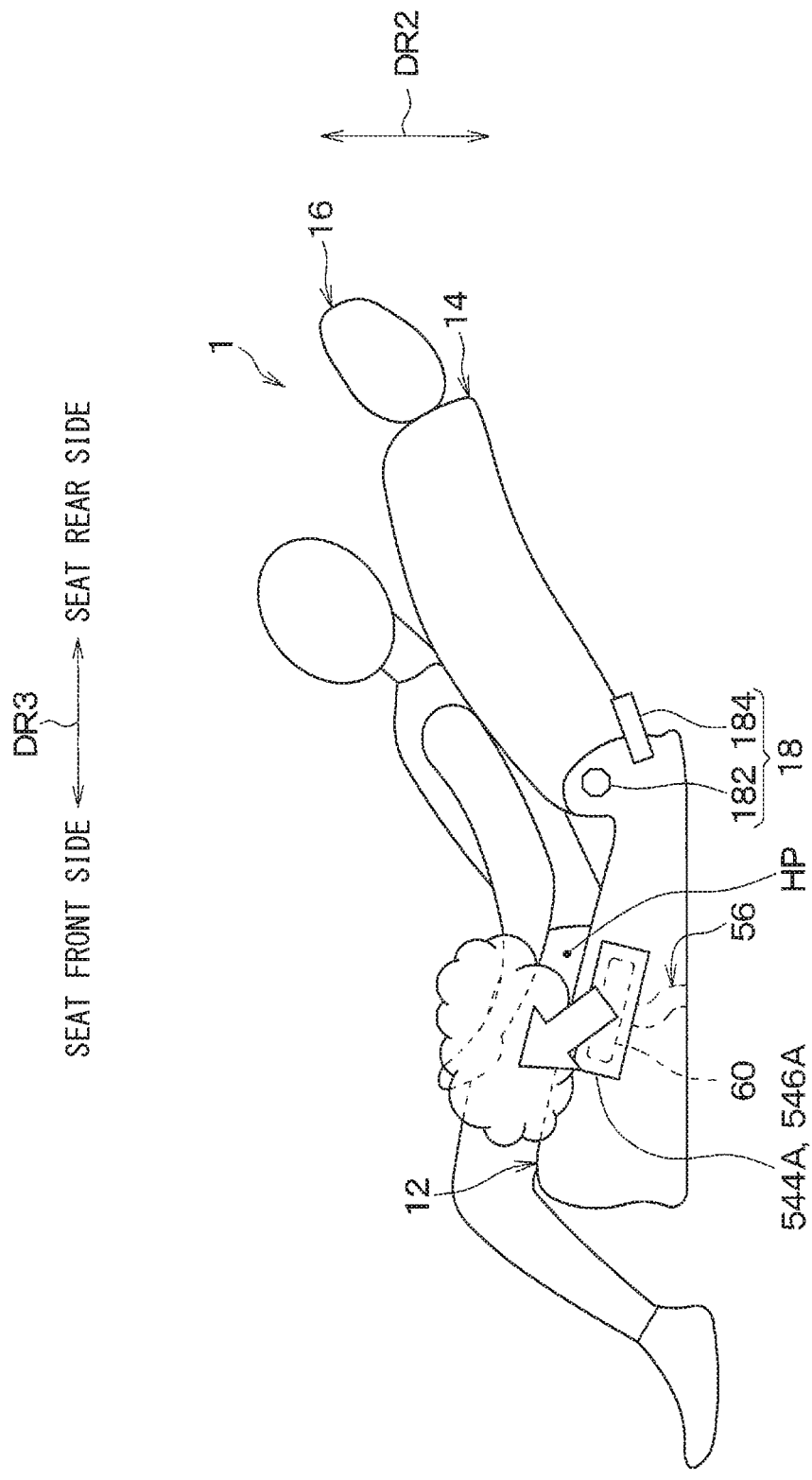
FIG. 23 is an illustrative view illustrating the wind direction of the air blown out from the side blowing port when the vehicle seat assumes a full flat posture according to another embodiment.

For that reason, when the side blowing ports 544A and 546A are provided in the seat cushion portion 12, the wind direction adjustment unit 60 may be provided in each of the side blowing ports 544A and 546A. According to the above configuration, as shown in FIGS. 22 and 23, even if the posture of the vehicle seat 1 changes, air can be blown out from the side blowing ports 544 and 546 toward the vicinity of the thighs of the seated occupant. In the seat air conditioner 50, the wind direction adjustment units 60 may be provided in the air blowing portions of both the seat cushion portion 12 and the seat back portion 14.

As in the embodiments described above, it is desirable to reduce the blowing capacity of the blower 52 so that the amount of air blown out from the air blowing portion 54 decreases as the reclining angle θr increases, but the present disclosure is not limited to the above configuration. For example, the seat air conditioner 50 may have a configuration in which the blowing capacity of the blower 52 is adjusted without being interlocked with the reclining angle θr.

As in each of the embodiments described above, when the reclining angle θr is at an acute angle, it is desirable to lower the blowing capacity of the blower 52 as compared with the case where the reclining angle θr is at an obtuse angle, but the present disclosure is not limited to the above configuration. For example, the seat air conditioner 50 may have a configuration in which the blowing capacity of the blower 52 is adjusted without being interlocked with the reclining angle θr.

In each of the embodiments described above, an example in which the side blowing ports 544 and 546 are disposed outside the side support portion 146 of the seat back portion 14 has been described, but the present disclosure is not limited to the above configuration. The side blowing ports 544 and 546 may be disposed, for example, with respect to the side support portion 146.

In the first embodiment described above, an example in which the seat air conditioner 50 of the present disclosure is applied to the seat back portion 14 provided with the center blowing portion 542 and the side blowing ports 544 and 546 has been described, but the present disclosure is not limited to the above example. The seat air conditioner 50 can also be applied to, for example, the seat back portion 14 in which the center blowing portion 542 is eliminated and only the side blowing ports 544 and 546 are provided. This also applies to the case where the seat air conditioner 50 is applied to the seat cushion portion 12.

In each of the embodiments described above, an example in which the seat air conditioner 50 of the present disclosure is applied to the vehicle seat 1 configured by the power seat capable of adjusting the reclining angle θr by an electric power has been described, but the present disclosure is not limited to the above example. The seat air conditioner 50 according to the present disclosure can be applied to, for example, a normal seat in which the reclining angle θr is manually adjusted as long as the wind direction of the air blown out from the air blowing portion 54 can be adjusted in conjunction with the reclining angle θr.

In each of the embodiments described above, an example in which the wind direction adjustment unit 60 changes the wind direction of the air blown out from the air blowing portion 54 by the control of the actuator 64 has been described, but the present disclosure is not limited to the above example. The wind direction adjustment unit 60 may be configured to be connected to the reclining mechanism portion 18 through a predetermined link mechanism, for example, and to change the wind direction of the air blown out from the air blowing portion 54 in conjunction with the operation of the reclining mechanism portion 18.

In each of the embodiments described above, an example in which the blower 52 is disposed below the floor surface portion 20 of the vehicle has been described, but the present disclosure is not limited to the above example. The blower 52 may be incorporated in the vehicle seat 1, for example.

In each of the embodiments described above, an example in which the air adjusted to a desired temperature by the vehicle interior air conditioning unit is blown out from the vehicle seat 1 has been described, but the present disclosure is not limited to the above example. The seat air conditioner 50 may include, for example, a temperature adjustment unit for adjusting the temperature of the air blown out from the vehicle seat 1.

In each of the embodiments described above, an example in which the seat air conditioner 50 of the present disclosure is applied to the vehicle seat 1 has been described, but the present disclosure is not limited to the above example. The seat air conditioner 50 according to the present disclosure is widely applicable to seats used in other than vehicles.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like, and the like.

CONCLUSION

According to a first aspect shown in a part or all of the embodiments described above, the seat air conditioner is applied to a seat configured to include the reclining mechanism portion. The seat air conditioner includes the wind direction adjustment unit for adjusting the wind direction of the air blown out from at least a part of the air blowing portion. The wind direction adjustment unit adjusts the wind direction of the air blown out from at least a part of the air blowing portion so that the air from at least a part of the air blowing portion is blown out toward a specific part of the seated occupant regardless of the reclining angle when the seat back portion is inclined toward the seat rear side.

According to a second aspect, the air blowing portion of the seat air conditioner includes the center blowing port provided in the center support portion of the seat for supporting the seated occupant, and the side blowing port provided outside the center support portion of the seat in the seat width direction. The wind direction adjustment unit is configured to adjust the wind direction of the air blown out from the side blowing port so that the wind direction of the air blown out from the side blowing port is inclined toward the front side of the seat as the reclining angle increases.

The side blowing port provided outside the seat in the seat width direction is hardly covered by the seated occupant as compared with the center blowing port provided in the center support portion supporting the seated occupant of the seat, and the direction of the air blown out from the blowing port is easily changed. For that reason, in the seat air conditioner according to the present disclosure, when the seat back portion is inclined toward the rear side of the seat, the wind direction of the air blown out from the side blowing port is changed so as to be inclined toward the front side of the seat so as to follow the seat back portion. According to the above configuration, when the seat back portion is inclined toward the rear side of the seat, the air can be blown while avoiding a part of the seated occupant who feels uncomfortable, and therefore, the comfort of the seated occupant can be ensured.

According to a third aspect, the wind direction adjustment unit of the seat air conditioner includes the wind direction plate provided inside the air blowing portion for varying the wind direction of air, the actuator for outputting the driving force for operating the wind direction plate, and the wind direction control unit for controlling the actuator. The wind direction control unit controls the operation of the actuator so that the wind direction of the air blown out from the air blowing portion is inclined toward the front side of the seat as the reclining angle increases.

As described above, in the configuration in which the wind direction plate provided inside the air blowing portion is driven by the actuator, the appearance of the seat is not changed when the wind direction of the air blowing out from the air blowing portion is changed, and therefore the design of the seat can be secured.

According to a fourth aspect, the seat air conditioner includes the air volume control unit for controlling the blowing capacity of the blower. The air volume control unit lowers the blowing capacity of the blower so that the air volume of the air blown out from the air blowing portion decreases as the reclining angle increases.

The seated occupant tends to increase the reclining angle of the seat when the seated occupant wants to relax. When the seated occupant wants to relax, if a large amount of air is blown out toward the seated occupant, the seated occupant may feel uncomfortable.

On the other hand, the seat air conditioner according to the present disclosure has a configuration in which the amount of air blown out from the air blowing portion is reduced as the reclining angle increases, so that the comfort of the seated occupant can be ensured.

Further, as the reclining angle of the seat increases, the positions of the buttocks and the back of the seated occupant are greatly deviated toward the front side of the seat. For that reason, with a reduction in the amount of air blown out from the air blowing portion as the reclining angle increases, a large amount of air can be inhibited from being blown out toward a part of the seated occupant who feels uncomfortable.

According to a fifth aspect, when the reclining angle is an acute angle, the air volume control unit of the seat air conditioner lowers the blowing capacity of the blower so that the air volume of the air blown out from the air blowing portion is reduced as compared with the case in which the reclining angle is an obtuse angle.

When the reclining angle is an acute angle, it is considered that a person does not seat on the seat. For that reason, as compared with the case in which the reclining angle is an obtuse angle, the blowing capacity of the blower is lowered, thereby being capable of reducing wasteful operation of the blower.

According to a sixth aspect, when the body size of the seated occupant is smaller than the predetermined reference body size, the air volume control unit of the seat air conditioner lowers the blowing capacity of the blower so that the air volume of the air blown out from the air blowing portion is reduced as compared with the case when the body size of the seated occupant is equal to or larger than the reference body size.

A seated occupant having a smaller body size tends to be easily filled in a warm sense even if the amount of air blown out from the air blowing portion is small as compared with a seated occupant having a larger body size. In view of such a tendency, when the body size of the seated occupant is small, the blowing capacity of the blower is lowered as compared with the case where the body size of the seated occupant is large, thereby being capable of inhibiting wasteful operation of the blower while securing the comfort of the seated occupant.

The invention claimed is:

1. A seat air conditioner for a seat including a seat cushion portion for supporting a lower body of a seated occupant, a seat back portion for supporting an upper body of the seated occupant, and a reclining mechanism portion for varying a reclining angle of the seat back portion relative to the seat cushion portion, the seat air conditioner comprising:
   a blower that blows air;
   an air blowing portion from which the air blown by the blower is blown toward the seated occupant; and
   a wind direction adjustment unit that adjusts a wind direction of the air blown out from at least a part of the air blowing portion, wherein
   the wind direction adjustment unit is configured to adjust the wind direction of the air blown out from at least the part of the air blowing portion such that the air from at least the part of the air blowing portion is blown toward a specific part of the seated occupant regardless of the reclining angle when the seat back portion is inclined toward a rear side of the seat.

2. The seat air conditioner according to claim 1, wherein
   the air blowing portion includes a center blowing port provided in a center support portion of the seat which supports the seated occupant, and a side blowing port provided outward from the center support portion of the seat in a seat width direction, and
   the wind direction adjustment unit is configured to adjust the wind direction of the air blown out from the side blowing port such that as the reclining angle increases, the wind direction of the air blown out from the side blowing port is inclined toward a front side of the seat.

3. The seat air conditioner according to claim 1, wherein
   the wind direction adjustment unit includes:
   a wind direction plate provided inside the air blowing portion configured to vary the wind direction of the air blown out from the air blowing portion;
   an actuator that outputs a driving force for operating the wind direction plate; and
   a wind direction control unit that controls the actuator, and
   the wind direction control unit controls the operation of the actuator to incline the wind direction of the air blown out from the air blowing portion toward the front side of the seat as the reclining angle increases.

4. The seat air conditioner according to claim 1, further comprising:
   an air volume control unit that controls a blowing capacity of the blower, wherein
   the air volume control unit is configured to, as the reclining angle increases, lower the blowing capacity of the blower to decrease an air volume of the air blown out from the air blowing portion.

5. The seat air conditioner according to claim 4, wherein
   when the reclining angle is an acute angle, the air volume control unit lowers the blowing capacity of the blower such that the air volume of the air blown out from the air blowing portion is lower as compared to when the reclining angle is an obtuse angle.

6. The seat air conditioner according to claim 4, wherein
   when a body size of the seated occupant is smaller than a predetermined reference body size, the air volume control unit lowers the blowing capacity of the blower such that the air volume of the air blown out from the air blowing portion is lower as compared to when the body size of the seated occupant is equal to or larger than the reference body size.

7. A seat air conditioning system for a vehicle, comprising:
- a seat including
  - a seat cushion portion for supporting a lower body of a seated occupant,
  - a seat back portion for supporting an upper body of the seated occupant, and
  - a reclining mechanism configured to vary a reclining angle of the seat back portion relative to the seat cushion portion;
- a seat air conditioner including
  - a blower configured to blow air,
  - a port configured to carry the air blown by the blower toward the seated occupant, and
  - an actuator controllable to adjust a wind direction of the air blown out from the port; and
- a controller coupled to the seat air conditioner, the controller including a processor and a memory having stored thereon instructions that when executed by the processor cause the processor to:
  - control the actuator to vary the wind direction such that such that the air from the port is blown toward a specific part of the seated occupant regardless of the reclining angle when the seat back portion is inclined toward a rear side of the seat.

* * * * *